United States Patent
Kashiwagi

(10) Patent No.: US 6,265,146 B1
(45) Date of Patent: Jul. 24, 2001

(54) THERMALLY DEVELOPABLE PHOTOSENSITIVE MATERIAL

(75) Inventor: Hiroshi Kashiwagi, Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/513,479

(22) Filed: Feb. 25, 2000

(30) Foreign Application Priority Data

Mar. 1, 1999 (JP) .................................................. 11-052559

(51) Int. Cl.$^7$ .............................. G03C 1/498; G03C 1/20; G03C 1/34
(52) U.S. Cl. .......................... 430/584; 430/591; 430/613; 430/614; 430/619; 430/944
(58) Field of Search ..................................... 430/613, 614, 430/944, 584, 587, 586, 591, 619

(56) References Cited

U.S. PATENT DOCUMENTS

| | | | |
|---|---|---|---|
| 5,246,828 | * | 9/1993 | Okuyama et al. .................... 430/576 |
| 5,393,655 | * | 2/1995 | Sasaki et al. ......................... 430/603 |
| 5,571,664 | * | 11/1996 | Siegel et al. ......................... 430/506 |
| 5,763,153 | * | 6/1998 | Tsuzuki et al. ...................... 430/584 |

FOREIGN PATENT DOCUMENTS

| | | |
|---|---|---|
| 798129 | 1/1997 | (EP) . |
| 838722 | 4/1998 | (EP) . |
| 6230507 | 8/1994 | (JP) . |
| 9281631 | 10/1997 | (JP) . |

OTHER PUBLICATIONS

European Search Report EP 00 30 1621 XP 000073364
Research Disclosure, pp. 208 to 214 JP06/230507, Abstract, 1 p.

* cited by examiner

*Primary Examiner*—Thorl Chea
(74) *Attorney, Agent, or Firm*—Jordan B. Bierman; Bierman, Muserlian and Lucas

(57) ABSTRACT

A thermally developable photosensitive material of enhanced sensitivity, reduced variation in sensitivity following pre-exposure storage and improved silver image tone is disclosed, comprising a support having thereon an organic silver salt, a binder, a photosensitive silver halide, an infrared-sensitizing dye and a heteroatom containing macrocyclic compound.

16 Claims, No Drawings

THERMALLY DEVELOPABLE PHOTOSENSITIVE MATERIAL

FIELD OF THE INVENTION

The present invention relates to thermally developable photosensitive materials and in particular to thermally developable infrared-sensitive photographic materials of enhanced sensitivity, reduced variation in sensitivity following pre-exposure storage and improved silver image tone.

BACKGROUND OF THE INVENTION

As is different from conventional silver halide light sensitive photographic materials, there is no fixing process after development in thermally developable photosensitive materials. In the thermally developable photosensitive materials, there are, however, problems such that silver image tone easily varies. Recently, as a light source used for the thermally developable photosensitive materials are employed a laser light source at wavelengths in the infrared region due to its high energy and low price. In response thereto are employed thermally developable photosensitive materials which are spectrally sensitized with an infrared sensitizing dye. It has been commonly known that infrared-sensitizing dyes are inferior in adsorption to silver halide, as compared to visible region-sensitizing dyes, producing problems such as low sensitivity or marked reduction in sensitivity following pre-exposure storage. A technique of using an infrared sensitizing dye is disclosed in JP-A 5-66515 (hereinafter, the term, JP-A means an unexamined and published Japanese Patent Application). This technique, however, does not address any thermally developable photosensitive material and is not directed to solving problems such as reduction in sensitivity during pre-exposure storage or variation of silver image tone after development of thermally developable photosensitive materials. Binders used in thermally developable photosensitive materials are different from those used in conventional silver halide photographic materials, and therefore adsorption of spectrally sensitizing dyes used in the thermally developable photosensitive materials are also different from binder matrix of gelatin in the conventional silver halide photographic materials. Further, the thermally developable photosensitive material is added with an organic silver salt, a reducing agent and a silver cluster-bleaching agent which also exhibits antifogging function or an acid capable of adjusting thermal development. However, there has not been developed a means for improving silver image tone or pre-exposure storage stability, without deteriorating the function of such addenda.

SUMMARY OF THE INVENTION

Accordingly, it is a first object of the present invention to provide a thermally developable photosensitive material with higher sensitivity and reduced desensitization during pre-exposure storage.

A second object of the invention is to provide a thermally developable photosensitive material with improved silver image tone.

A third object of the invention is to provide an image recording method and an image forming method by use of the thermally developable photosensitive materials described above.

As a result of the studies by the inventors of the present invention, the above objects of the invention can be accomplished by the following constitution:

1. A thermally developable photosensitive material comprising a support having thereon an organic silver salt, a binder, a photosensitive silver halide, a spectrally infrared sensitizing dye and a heteroatom containing a macrocyclic compound;

2. A thermally developable photosensitive material comprising a support having thereon an organic silver salt, a binder, a photosensitive silver halide, a heteroatom-containing macrocyclic compound and an infrared sensitizing dye represented by the following formula (1), (2), (3) or (4):

Formula (1)

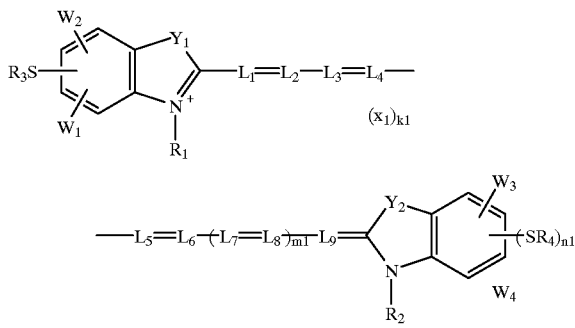

Formula (2)

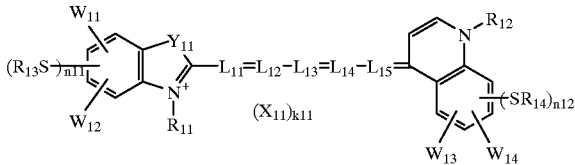

wherein $Y_1$, $Y_2$ and $Y_{11}$ each are independently an oxygen atom, sulfur atom, selenium atom or —CH=CH—; $L_1$ to $L_9$ and $L_{11}$ to $L_{15}$ each are independently a methine group; $R_1$, $R_2$, $R_{11}$ and $R_{12}$ each are independently an aliphatic group; $R_3$, $R_4$, $R_{13}$ and $R_{14}$ each are independently an alkenyl group, a cycloalkyl group or a heterocyclic group; $W_1$, $W_2$, $W_3$, $W_4$, $W_{11}$, $W_{12}$, $W_{13}$ and $W_{14}$ each are independently a hydrogen atom, a substituent or a non-metallic atom group necessary to form a condensed ring by bonding between $W_1$ and $W_2$, $W_3$ and $W_4$, $W_{11}$ and $W_{12}$, or $W_{13}$ and $W_{14}$; $X_1$ and $X_{11}$ each are an ion necessary to compensate for an intramolecular charge; k1 and k11 each are a number of the ion necessary to compensate for the intramolecular charge; m1 is 0 or 1; and n1, n11 and n12 each are 0, 1 or 2, provided that n11 and n12 are not 0 at the same time;

Formula (3)

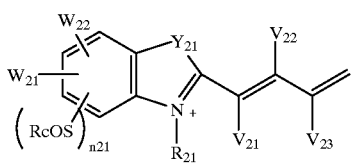

-continued

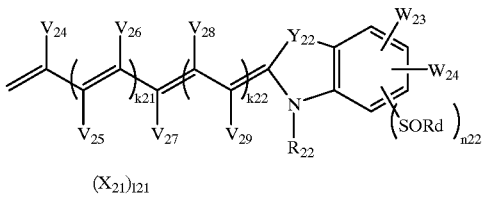

Formula (4)

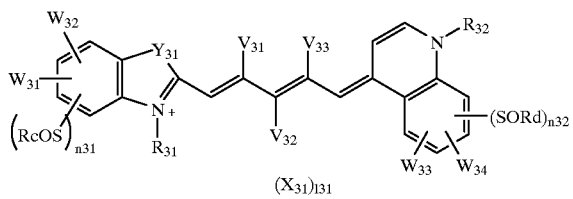

wherein $Y_{21}$, $Y_{22}$ and $Y_{31}$ each are independently an oxygen atom, a sulfur atom, a selenium atom, —C(Ra)(Rb)— group or —CH=CH— group, in which Ra and Rb each are a lower alkyl group, a cycloalkyl group, an aralkyl group, a lower alkoxyl group, an aryl group and a halogen atom; $R_{21}$, $R_{22}$, $R_{31}$ and $R_{32}$ each are independently an aliphatic group; Rc and Rd each are independently a lower alkyl group, a cycloalkyl group, an aralkyl group, an aryl group or a heterocyclic group; $W_{21}$, $W_{22}$, $W_{23}$, $W_{24}$, $W_{31}$, $W_{32}$, $W_{33}$ and $W_{34}$ each are independently a hydrogen atom, a substituent or a non-metallic atom group necessary to form a condensed ring by bonding between $W_{21}$ and $W_{22}$, $W_{23}$ and $W_{24}$, $W_{31}$ and $W_{32}$, or $W_{33}$ and $W_{34}$; $V_{21}$ to $V_{29}$, and $V_{31}$ to $V_{33}$ each are independently a hydrogen atom, a halogen atom, an amino group, an alkylthio group, an arylthio group, a lower alkyl group, a lower alkoxyl group, an aryl group, an aryloxyl group, a heterocyclic group or a non-metallic atom group necessary to form a 5- to 7-membered ring by bonding between $V_{21}$ and $V_{23}$, $V_{22}$ and $V_{24}$, $V_{23}$ and $V_{25}$, $V_{24}$ and $V_{26}$, $V_{25}$ and $V_{27}$, $V_{26}$ and $V_{28}$, $V_{27}$ and $V_{29}$, or $V_{31}$ and $V_{33}$; $X_{21}$ and $X_{31}$ each are an ion necessary to compensate for an intramolecular charge; 121 and 131 each an ion necessary to compensate for an intramolecular charge; k21 and k22 each are 0 or 1; n21, n22, n31 and n32 each are 0, 1 or 2, provided that n21 and n22, or n31 and n32 are not 0 at the same time;

3. The thermally developable photosensitive material described in 1 or 2 above, wherein the photosensitive silver halide grain has an average iodide content of 0.1 to 10 mol % in the vicinity of the grain surface;

4. An image recording method, wherein a thermally developable photosensitive material described in any one of 1 to 3 above is exposed by using a laser exposure apparatus, in which scanning laser light is not exposed at an angle substantially vertical to the exposed surface of the photosensitive material;

5. An image recording method, wherein a thermally developable photosensitive material described in any one of 1 to 3 above is exposed by using a laser exposure apparatus, in which scanning laser light is longitudinally multiple;

6. An image recording method, wherein a thermally developable photosensitive material described in any one of 1 to 3 above is thermally developed in a state of containing an organic solvent of 40 to 4500 ppm.

DETAILED DESCRIPTION OF THE INVENTION

Infrared sensitizing dyes, as described above, are generally weak in adsorption and inferior in storage stability after spectral sensitization of photographic materials, producing problems such that sufficient sensitivity is not obtained and desensitization is rather large when the photographic materials are stocked. The thermally developable photosensitive material comprises silver halide grains, together with organic silver salt grains, dispersed in a thermosoftening binder, which is more hydrophobic than gelatin (such as polyvinyl butyral). When heated, the organic silver salt is reduced with a reducing agent incorporated into the same layer or an adjacent layer to form images through solution physical development in the heated and softened binder. Accordingly, it is supposed that a sensitizing dye adsorbed to silver halide is apparently in a state disadvantageous for the adsorption equilibrium, as compared to conventional silver halide photographic materials comprising gelatin matrix. To improve these defects, it has been attempted that the structure of a spectral-sensitizing dye itself was varied, an infrared sensitizing dye exhibiting strong adsorption, enhanced sensitivity and not so marked desensitization was explored, and a compound promoting adsorption by the combined use with the sensitizing dye and being effective to enhance sensitivity and improve raw stock stability was also explored. As a result of the investigation by the inventor of the present invention, it was proved that the use of a heteroatom containing macrocyclic compound led to improvements in the problems described above of the thermally developable photosensitive materials.

The heteroatom containing macrocyclic compound contained in thermally developable photosensitive materials is more effective when used with an infrared sensitizing dye, leading to enhanced sensitivity and an improvement in desensitization during storage. Specifically, the use in combination with the infrared sensitizing dyes represented by the formulas (1) to (4) described above is furthermore effective. The heteroatom containing macrocyclic compound refers to a nine- or more membered macrocyclic compound containing at least a heteroatom selected from a nitrogen atom, an oxygen atom, a sulfur atom and a selenium atom. The macrocyclic compound is preferably a 12- to 24-membered ring and more preferably 15- to 21-membered ring. Representative compounds thereof include compounds commonly known as a crown ether, which was synthesized by Pederson in 1967 and a number of which have been synthesized since its specific report. The compounds are detailed in C. J. Pederson, Journal of American Chemical Society vol. 86 (2495), 7017–7036 (1967); G. W. Gokel & S. H. Korzeniowski, "Macrocyclic Polyether Synthesis", Springer-Vergal (1982); "Chemistry of Crown Ether" edited by Oda, Shono & Tabuse, published by Kyoritsu Shuppan (1978); "Host-Guest" edited by Tabuse, published by Kyoritsu Shuppan (1979); and Suzuki & Koga, Yuki Gosei Kagaku (Journal of Organic Synthetic Chemistry) vol. 45 (6) 571–582 (1987).

Exemplary examples of the heteroatom containing macrocyclic compounds used in the invention are shown below, but are not limited to these examples.

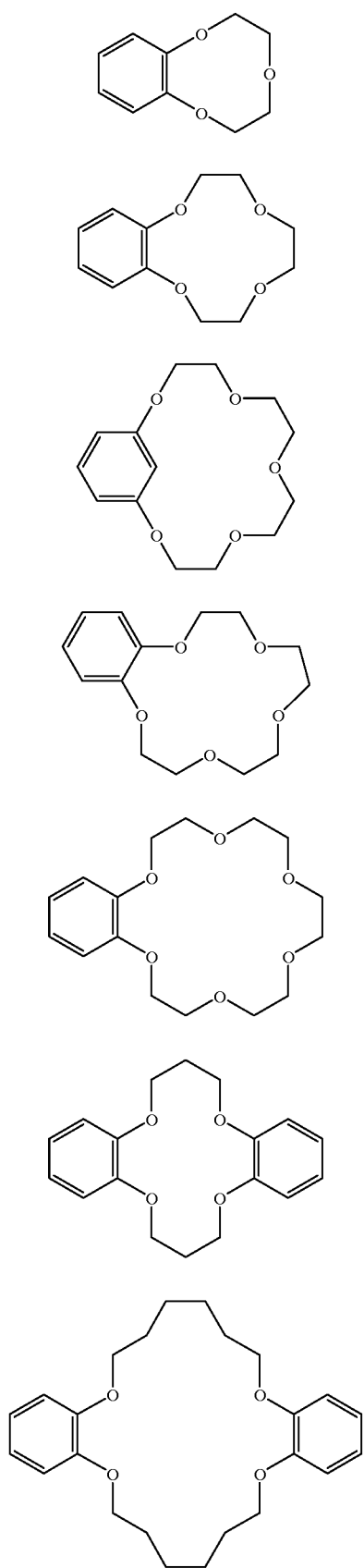

S-14 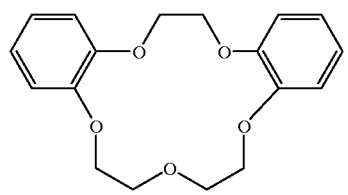
S-20 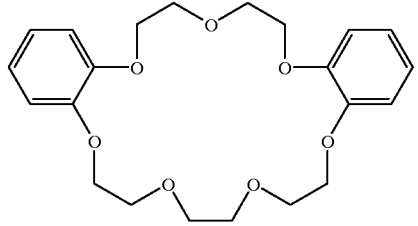
S-15 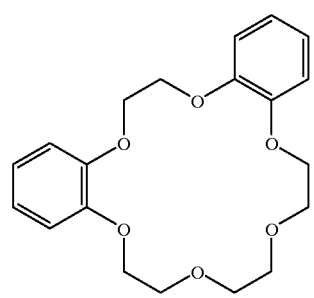
S-21 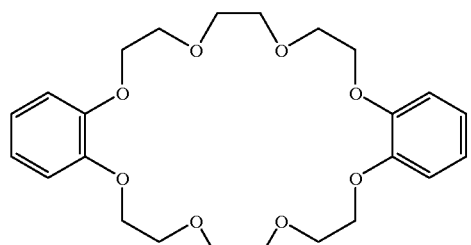
S-16 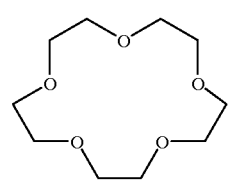
S-22 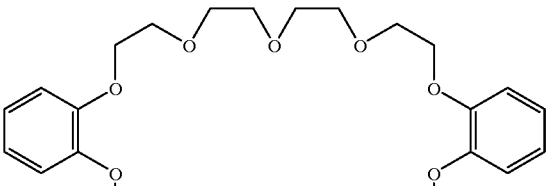
S-17 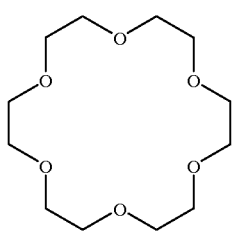
S-23 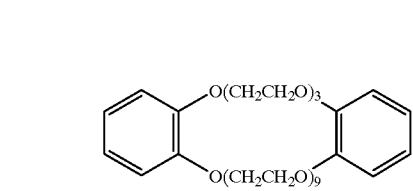
S-18 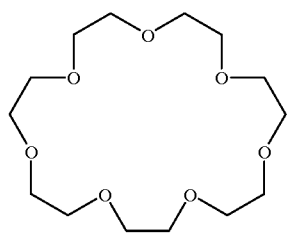
S-24 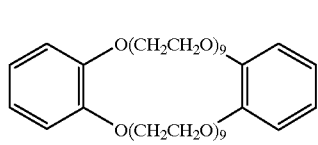
S-19 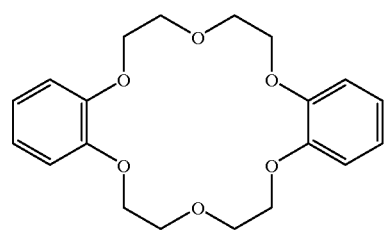
S-25 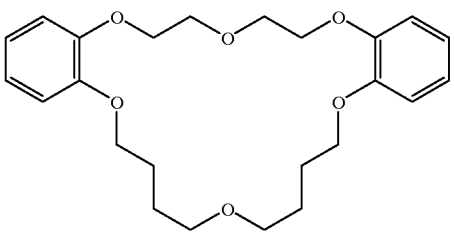

-continued
S-26
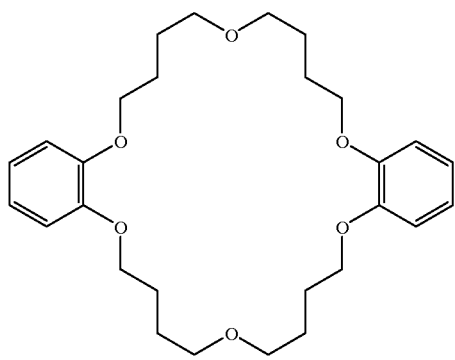
S-27
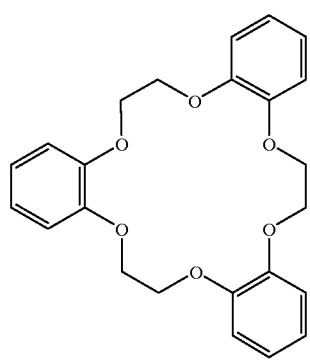
S-28
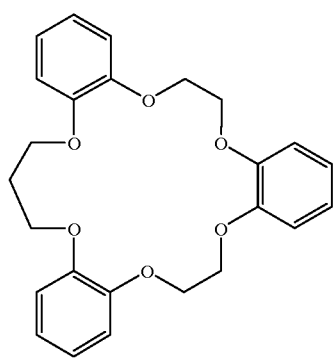
S-29
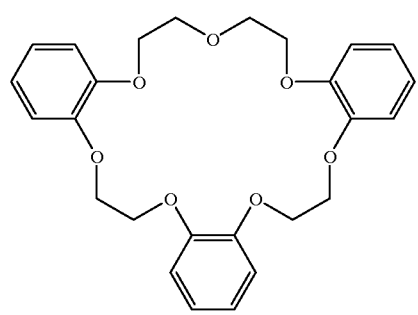
-continued
S-30
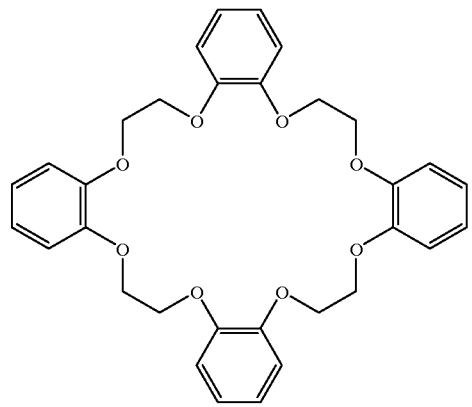
S-31
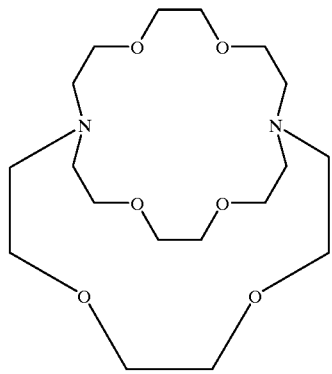
S-32
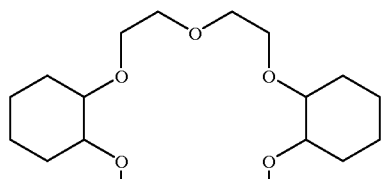
S-33
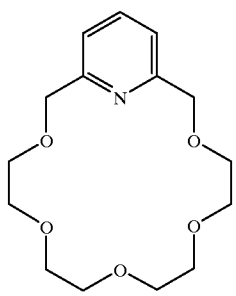
S-34
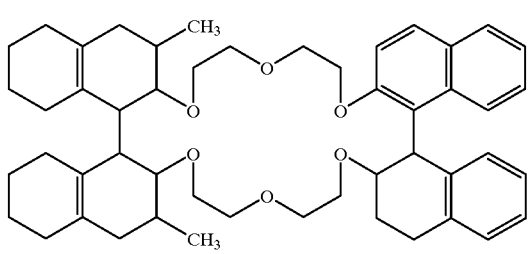

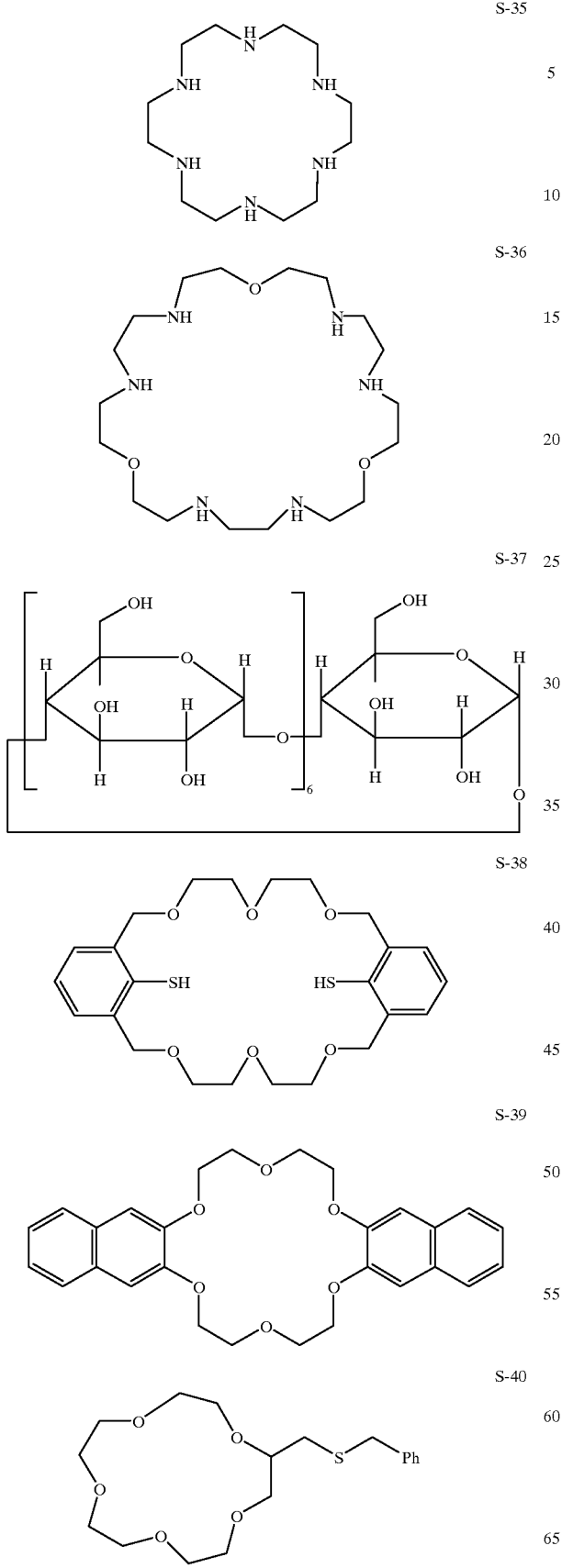

ph: phenyl

Effects of incorporation of these compounds into conventional silver halide photographic materials are described in the literature described above. However, it is surprising that unexpected effects were found even in the thermally developable photosensitive materials, which are entirely different in condition from the conventional silver halide photographic materials. It is not definitely cleared why these compounds exhibited advantageous effects specifically in the thermally developable photographic material. Unlike the photosensitive layer of the conventional silver halide photographic material, the thermally developable photosensitive layer contains a silver source other than silver halide (such as organic silver salts or toning agent silver complex salts), so that it is supposed that adsorption of a sensitizing dye to silver halide is easily deteriorated, as compared to the conventional silver halide photographic materials. It is also contemplated that the heteroatom containing macrocyclic compound acts onto it, promoting adsorption of the dye to silver halide.

The heteroatom containing macrocyclic compound may be added at any stage after forming silver halide and until preparing a coating solution, and is added preferably prior to adding the sensitizing dye. To enhance effects of the compound in the thermally developable photosensitive material, as will be described later, it is preferred to introduce an iodide into the region in the vicinity of the surface of silver halide grains used in the thermally developable photosensitive material. It is necessary to further strengthen the adsorption, as compared to conventional systems using gelatin. The heteroatom containing macrocyclic compounds are generally incorporated into the thermally developable photosensitive layer through solution in organic solvents such as methanol, ethanol or fluorinated alcohols, or water. In cases where solubility is not sufficient, dissolution-promoting agent may be used in combination, including potassium acetate, potassium iodide, potassium fluoride, potassium p-toluenesulfonate, $KBF_4$, $KPF_6$, $NH_4BF_4$ and $NH_4PF_6$. Any compound containing an ion capable of forming an inclusion compound together with the heteroatom containing macrocyclic compound, which is able to improve solubility may be usable as the dissolution-promoting agent.

The infrared sensitizing dyes, which are preferably used in combination with the heteroatom containing macrocyclic compound will be described.

In the sensitizing dyes represented by formulas (1) and (2), examples of the aliphatic group represented by $R_1$, $R_2$, $R_{11}$ and $R_{12}$ include a branched or straight-chained alkyl group having 1 to 10 carbon atoms (e.g., methyl, ethyl, propyl, butyl, pentyl, i-pentyl, 2-ethyl-hexyl, octyl, decyl), an alkenyl group having 3 to 10 carbon atoms (e.g., 2-propenyl, 3-butenyl, 1-methyl-3-propenyl, 3-pentenyl, 1-methyl-3-butenyl, 4-hexenyl), and an aralkyl group having 7 to 10 carbon atoms (e.g., benzyl, phenethyl). These groups may further be substituted with a substituent, including groups such as a lower alkyl group (preferably having 1 to 5 carbon atoms, e.g., methyl, ethyl, propyl), a halogen atom (e.g., fluorine atom, chlorine atom, or bromine atom), a vinyl group, an aryl group (e.g., phenyl, p-tolyl, p-bromophenyl), trifluoromethyl, an alkoxyl group (e.g., methoxy, ethoxy, methoxyethoxy), an aryloxyl group (e.g., phenoxy, p-tolyloxy), cyano, a sulfonyl group (e.g., methanesulfonyl, trifluoromethansulfonyl, p-toluenesulfonyl), an alkoxycarbonyl group (e.g., ethoxycarbonyl, butoxycarbonyl), an amino group (e.g., amino, biscarboxymethylamino), an aryl group (e.g., phenyl, carboxyphenyl), a heterocyclic group (e.g., tetrahydrofurfuryl, 2-pyrrolidinone-1-yl), an acyl group (e.g., acetyl, benzoyl), an ureido group (e.g., ureido, 3-methylureido, 3-phenylureido), a thioureido group (e.g., thioureido, 3-methylthioureido), an alkylthio group (e.g., methylthio, ethylthio), an arylthio group (e.g., phenylthio), a heterocyclic-thio group (e.g., 2-thienythio, 3-thienylthio, 2-imidazolylthio), a carbonyloxy group (e.g., acetyloxy, propanoyloxy, benzoyloxy), an acylamino group (e.g., acetylamino, benzoylamino); a thioamido group (e.g., thioacetoamide, thiobenzoylamino) and hydrophilic groups, such as a sulfo group, a carboxy group, a phosphono group, a sulfate group, hydroxy, mercapto, sulfino group, a carbamoyl group (e.g., carbamoyl, n-methylcarbamoyl, N,N-tetramethylenecarbamoyl), a sulfamoyl group (e.g., sulfamoyl, N,N-3-oxapentamethylenaminosulfonyl), a sulfonamido group - _(e.g., methanesulfonamido, butanesulfoneamido), a sulfonylaminocarbonyl group (e.g., methanesulfonylaminocarbonyl, ethanesulfonylaminocarbonyl), an acylaminosulfonyl group (e.g., acetoamidosulfonyl, methoxyacetoamidosulfonyl), an acylaminocarbonyl group (e.g., acetoamidocarbonyl, methoxyacetoamidocarbonyl), and a sulfinylaminocarbonyl group (e.g., methasulfinylaminocarbonyl, ethanesulfinylaminocarbonyl). Examples of aliphatic groups substituted by a hydrophilic group include carboxymethyl, carboxypentyl, 3-sulfatobutyl, 3-sulfopropyl, 2-hydroxy-3-sulfopropyl, 4-sulfobutyl, 5-sulfopentyl, 3-sulfopentyl, 3-sulfinobutyl, 3-phosphonopropyl, hydroxyethyl, N-methanesulfonylcarbamoylmethyl, 2-carboxy-2-propenyl, o-sulfobenzyl, p-sulfobenzyl and p-carboxybenzyl.

Examples of the alkenyl group represented by $R_3$, $R_4$, $R_{13}$ and $R_{14}$ include 2-propenyl, 3-butenyl, 1-methyl-3-propenyl, 3-pentenyl, 1-methyl-3-butenyl and 4-hexenyl; examples of the cyclic alkyl group include cyclopropyl, cyclopentyl and cyclohexyl; and examples of the heterocyclic group include 2-thienyl, 3-thienyl and 1-methyl-2-imidazolyl, and these groups may be substituted by a group such as a lower alkyl group (preferably having 1 to 5 carbon atoms, e.g., methyl, ethyl), a lower alkoxyl group (preferably having 1 to 5 carbon atoms, e.g., methoxy, ethoxy, hydroxy, a halogen atom (e.g., fluorine atom, chlorine atom, bromine atom, iodide atom), an aryl group (e.g., phenyl, tolyl, chlorophenyl), mercapto group, and a lower alkylthio group (preferably having 1 to 5 carbon atoms, e.g., methylthio, ethylthio).

Examples of the substituents represented by $W_1$ to $W_4$ and $W_{11}$ to $W_{14}$ include an alkyl group (e.g., methyl, ethyl, butyl, I-butyl), an aryl group (including monocyclic and polycyclic ones such as phenyl and naphthyl), a heterocyclic group (e.g., thienyl, furyl, pyridyl, carbazolyl, pyrrolyl, indolyl), a halogen atom (e.g., fluorine atom, chlorine atom, bromine atom, iodine atom), a vinyl group, an aryl group (e.g., phenyl, p-tolyl, p-bromophenyl), trifluoromethyl, an alkoxyl group (e.g., methoxy, ethoxy, methoxyethoxy), an aryloxyl group (e.g., phenoxy, p-tolyloxy), a sulfonyl group (e.g., methanesulfonyl, p-toluenesulfonyl), an alkoxycarbonyl group (e.g., ethoxycarbonyl, ethoxycarbonyl), an amino group (e.g., amino, biscarboxymethylamino), an aryl group (e.g., phenyl, carboxyphenyl), a heterocyclic group (e.g., tetrahydrofurfuryl, 2-pyrrolidino-1-yl), an acyl group (e.g., acetyl, benzoyl), an ureido group (e.g., ureido, 3-methylureido), a thioureido group (e.g., thioureido, 3-methylthioureido), an alkylthio group (e.g., methylthio, ethylthio), an alkenyl thio group, an arylthio group (e.g., phenylthio), hydroxy and styryl.

These groups may be substituted by the same substituents as described in the aliphatic group represented by $R_1$. Examples of substituted alkyl group include 2-methoxyethyl, 2-hydroxyethyl, 3-ethoxycarbonylpropyl, 2-carbamoylethyl, 2-methanesulfonylethyl, 3-methanesulfonylaminopropyl, benzyl, phenethyl, carboxymethyl, carboxymethyl, allyl, and 2-furylethyl. Examples of substituted aryl groups include p-carboxyphenyl, p-N,N-dimethylaminophenyl, p-morpholinophenyl, p-methoxyphenyl, 3,4-dimethoxyphenyl, 3,4-methylenedioxyphenyl, 3-chlorophenyl, and p-nitrophenyl. Further, examples of substituted heterocyclic group include 5-chloro-2-pyridyl, 2-ethoxycarbonyl-2-pyridyl and 5-carbamoyl-2-pyridyl. $W_1$ and $W_2$, $W_3$ and $W_4$, $W_{11}$ and $W_{12}$, or $W_{13}$ and $W_{14}$ each pair may combine to form a condensed ring, such as 5- or 6-membered saturated or unsaturated condensed carbon rings, which are further substituted by substituents as described in the aliphatic group.

In the formulas (1) and (2), the methylene group represented by $L_1$ to $L_9$ and $L_{11}$ to $L_{15}$ each are a substituted or unsubstituted methylene group. Examples of the substituent thereof include a lower alkyl group (preferably having 1 to 5 carbon atoms, e.g., methyl, ethyl, i-propyl, benzyl), and an alkoxyl group (preferably having 1 to 5 carbon atoms, e.g., methoxy, ethoxy), an aryloxyl group (e.g., phenoxy, naphthoxy), an aryl group (e.g., phenyl, naphthyl, p-tolyl, o-carboxyphenyl), N ($V_1$) ($V_2$), —SR, a heterocyclic group [e.g., 2-thienyl, 2-furyl, N,N'-bis(methoxyethyl)barbituric acid], in which R is a lower alkyl group (preferably having 1 to 5 carbon atoms), an aryl group or a heterocyclic group; $V_1$ and $V_2$ are each a substituted or unsubstituted lower alkyl group (preferably having 1 to 5 carbon atoms) or aryl group, provided that $V_1$ and $V_2$ may combine to form a 5- or 6-membered nitrogen containing heterocyclic ring. Methylene groups which are adjacent or distant by one may combine to form a 5- or 6-membered ring.

In cases where the compound represented by formulas (1) and (2) is substituted by a cationic- or anionic-charged group, a counter ion is formed by an anionic or cationic equivalent to compensate an intramolecular charge. As an ion necessary to compensate the intramolecular charge, which is represented by $X_1$ or $X_2$, examples of cations include a proton, an organic ammonium ion (e.g., triethylammonium, triethanolammonium) and inorganic cations (e.g., cations of lithium, sodium and potassium); and examples of acid anions include halide ions (e.g., chloride ion, bromide ion, iodide ion), p-toluenesulfonate ion, perchlorate ion, tetrafluoroborate ion, sulfate ion, methylsulfate ion, ethylsulfate ion, methanesulfonate ion, trifluoromethanesulfonate ion).

Exemplary examples of the sensitizing dyes represented by formulas (1) and (2) are shown below, but are not limited to these compounds.

No. 1

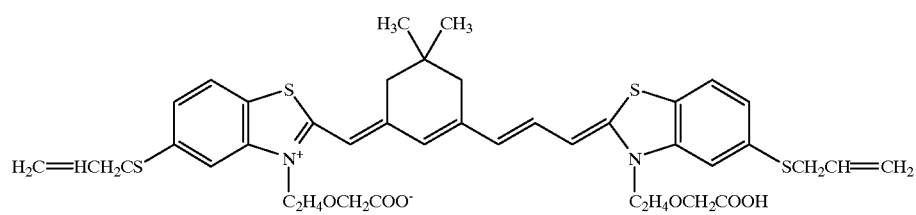

No. 2

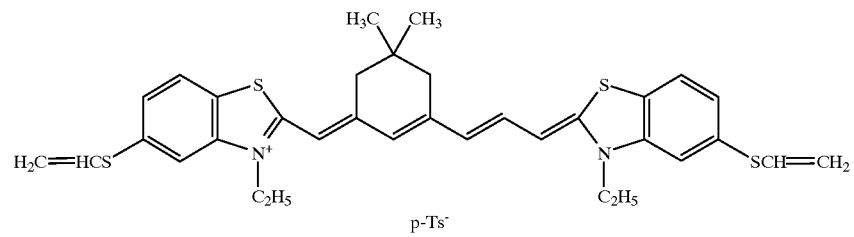

No. 3

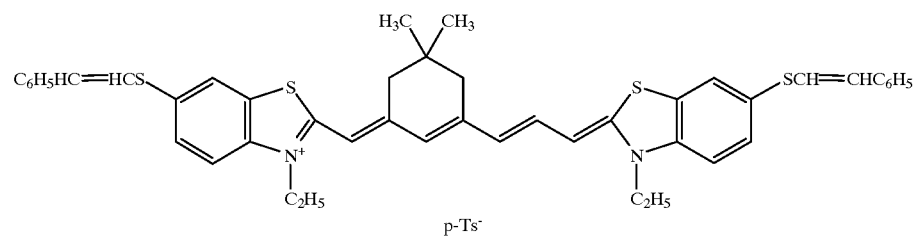

No. 4

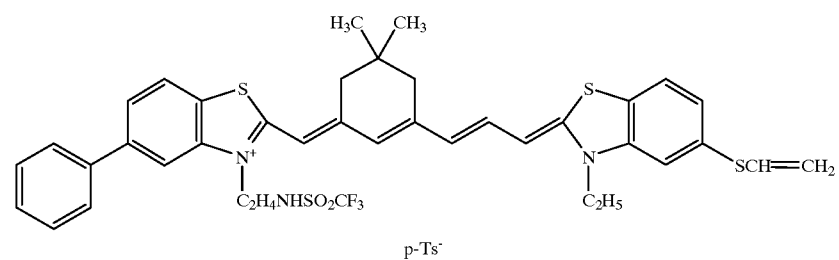

No. 5

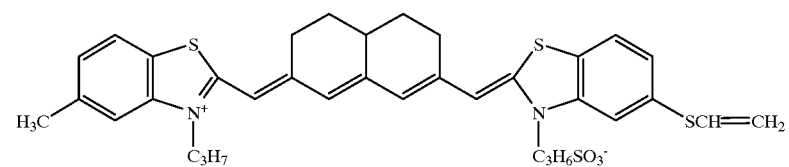

-continued
No. 6
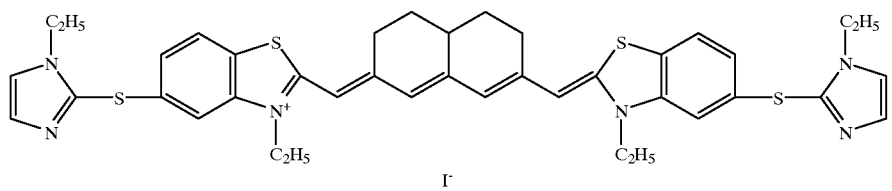
No. 7
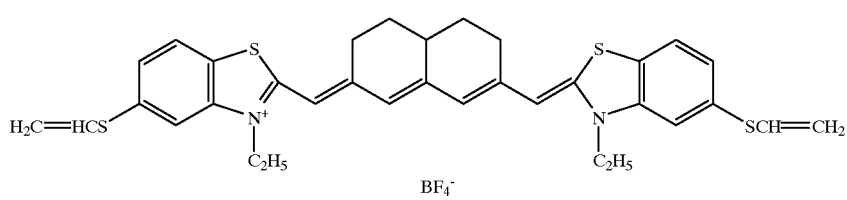
No. 8
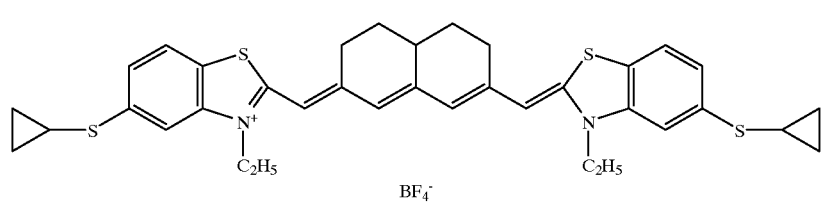
No. 9
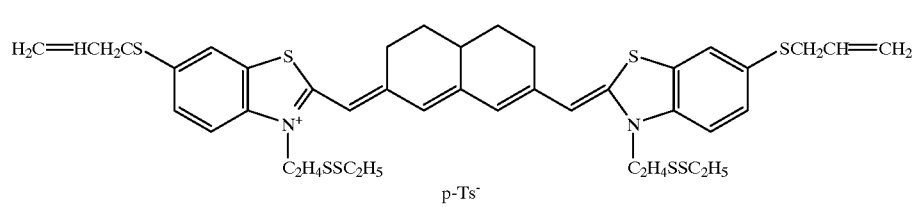
No. 10
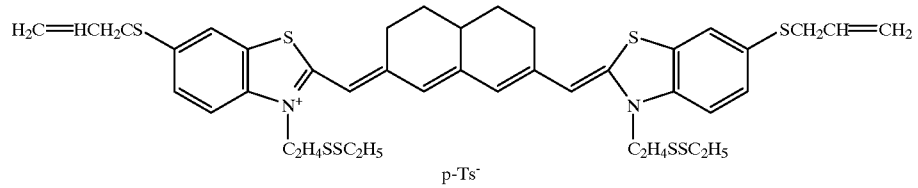
No. 11
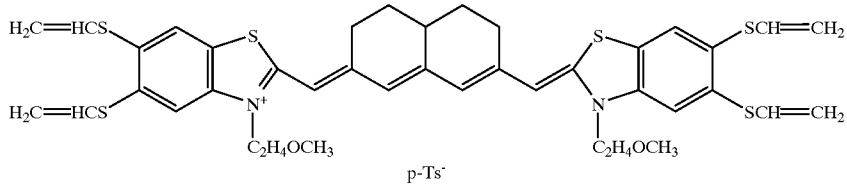
No. 12
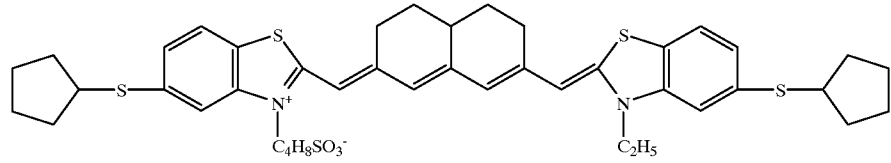
No. 13
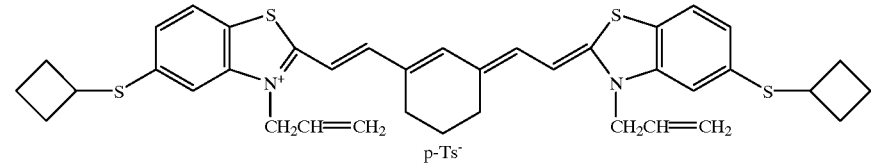
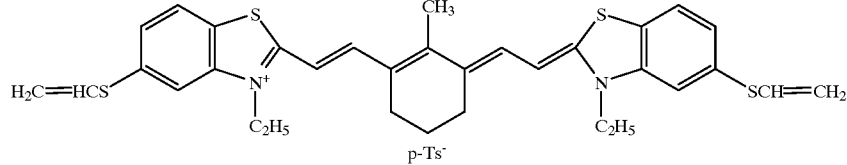

-continued
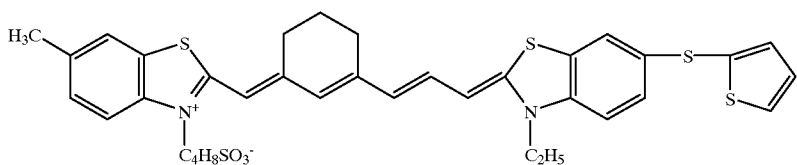
No. 14
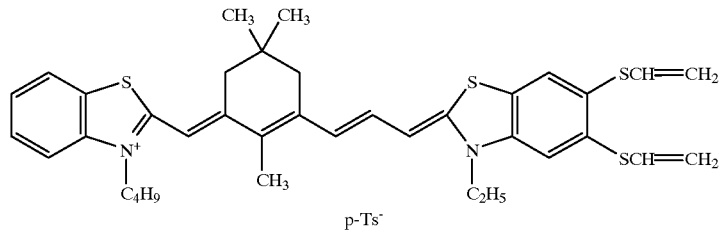
No. 15
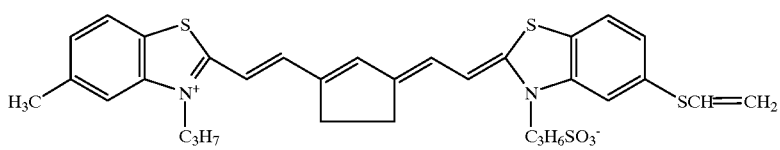
No. 16
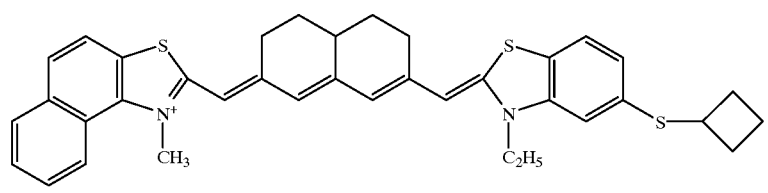
No. 17
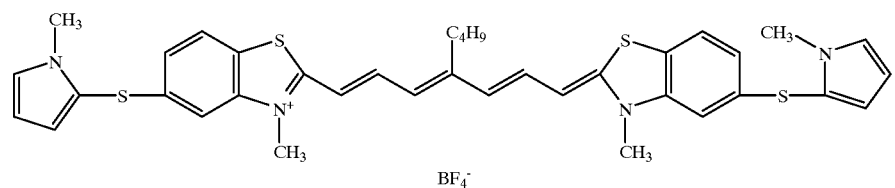
No. 18
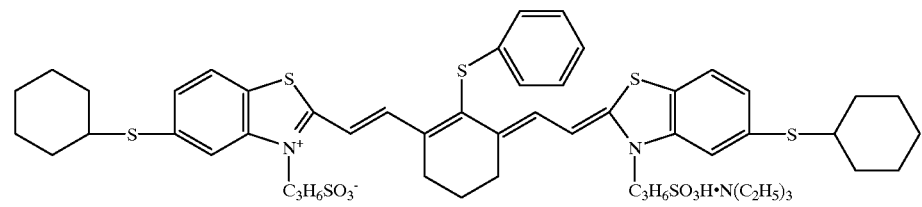
No. 19
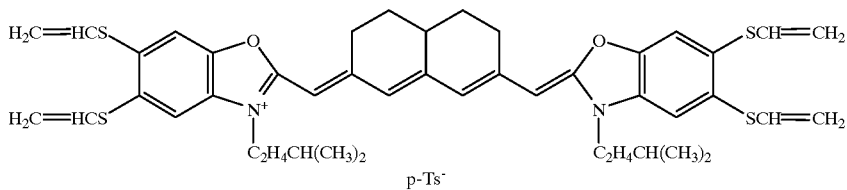
No. 20

No. 21
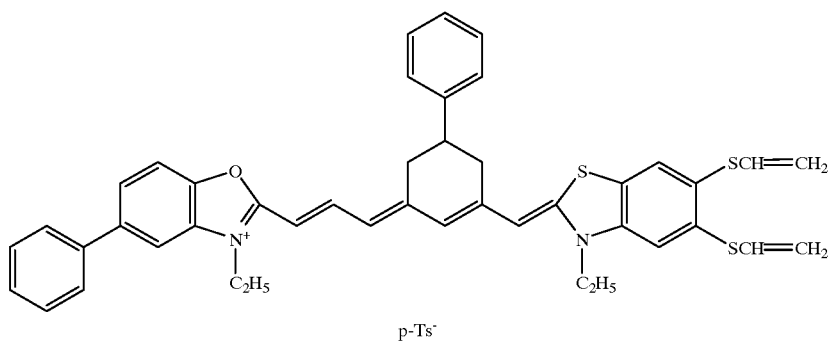
No. 22
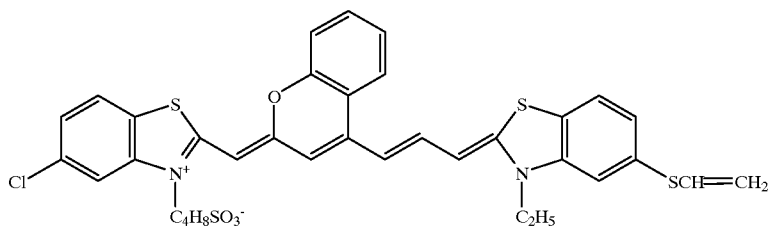
No. 23
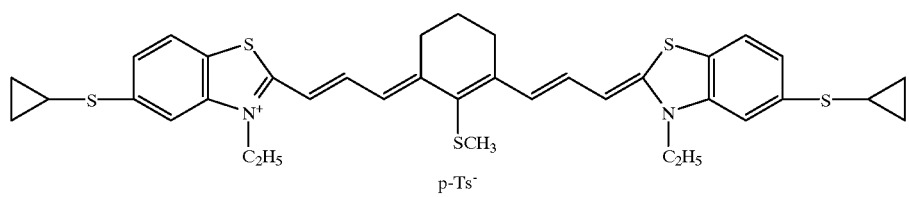
No. 24
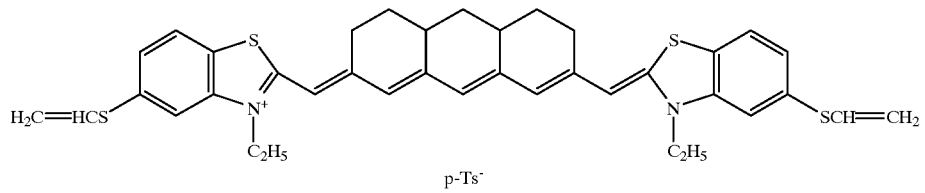
No. 25
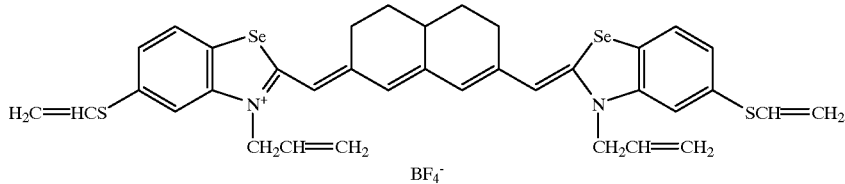
No. 26
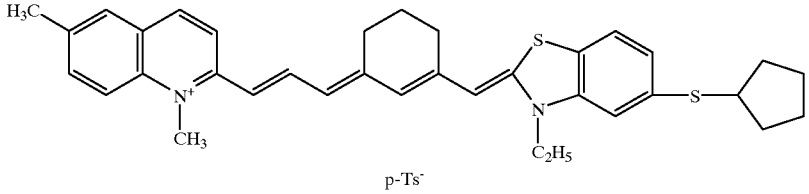

No. 27
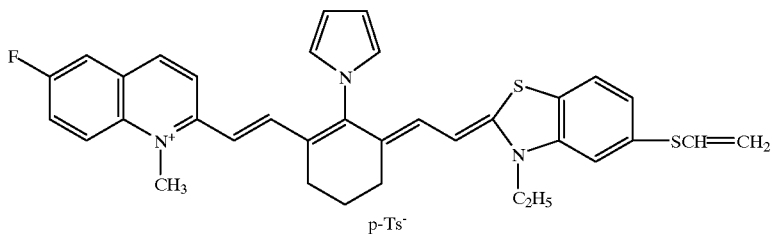

No. 28
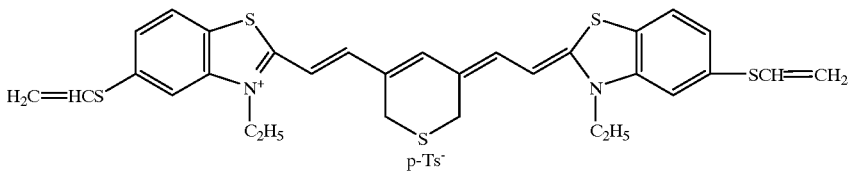

No. 29
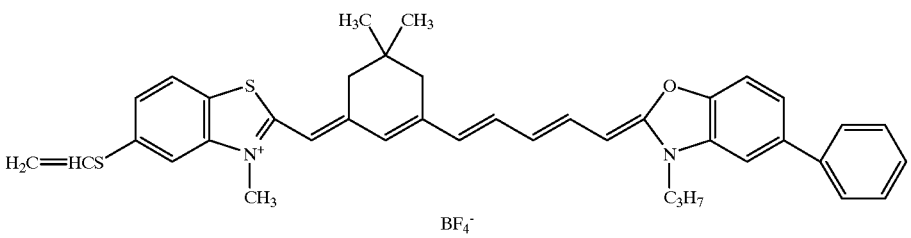

No. 30
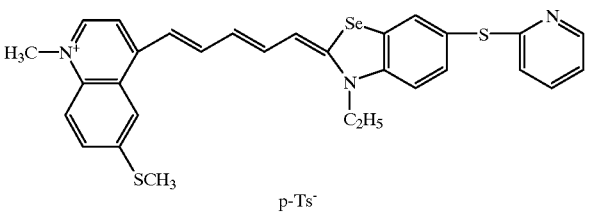

No. 31
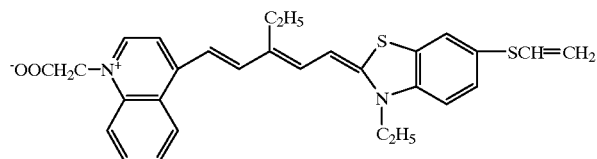

No. 32
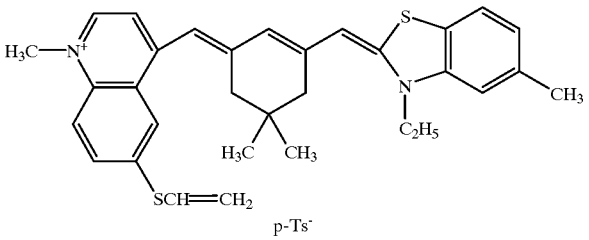

No. 33
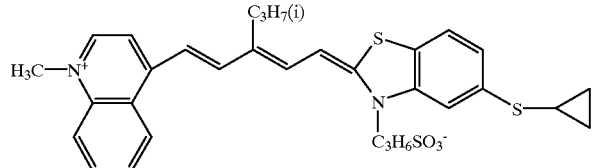

p-Ts⁻: p-toluenesulfonate ion

Sensitizing dyes represented by formulas (3) and (4) will be further described.

Examples of the aliphatic group represented by $R_{21}$, $R_{22}$, $R_{31}$ and $R_{32}$ include a branched or straight-chained alkyl group having 1 to 10 carbon atoms (e.g., methyl, ethyl, propyl, butyl, pentyl, I-pentyl, 2-ethyl-hexyl, octyl, decyl), an alkenyl group having 3 to 10 carbon atoms (e.g., 2-propenyl, 3-butenyl, 1-methyl-3-propenyl, 3-pentenyl, 1-methyl-3-butenyl, 4-hexenyl), and an aralkyl group having 7 to 10 carbon atoms (e.g., benzyl, phenethyl).

These groups may further be substituted with a substituent, including groups such as a lower alkyl group (preferably having 1 to 5 carbon atoms, e.g., methyl, ethyl, propyl), a halogen atom (e.g., fluorine atom, chlorine atom, or bromine atom), a vinyl group, an aryl group (e.g., phenyl, p-tolyl, p-bromophenyl), trifluoromethyl, an alkoxyl group (e.g., methoxy, ethoxy, methoxyethoxy), an aryloxyl group (e.g., phenoxy, p-tolyloxy), cyano, a sulfonyl group (e.g., methanesulfonyl, trifluoromethansulfonyl, p-toluenesulfonyl), an alkoxycarbonyl group (e.g., ethoxycarbonyl, butoxycarbonyl), an amino group (e.g., amino, biscarboxymethylamino), an aryl group (e.g., phenyl, carboxyphenyl), a heterocyclic group (e.g., tetrahydrofurfuryl, 2-pyrrolidinone-1-yl), an acyl group (e.g., acetyl, benzoyl), an ureido group (e.g., ureido, 3-methylureido, 3-phenylureido), a thioureido group (e.g., thioureido, 3-methylthioureido), an alkylthio group (preferably having 1 to 5 carbon atoms, e.g., methylthio, ethylthio), an arylthio group (e.g., phenylthio), a heterocyclic-thio group (e.g., 2-thienythio, 3-thienylthio, 2-imidazolylthio), a carbonyloxy group (e.g., acetyloxy, propanoyloxy, benzoyloxy), an acylamino group (e.g., acetylamino, benzoylamino); a thioamido group (e.g., thioacetoamido, thiobenzoylamido) and hydrophilic groups, such as a sulfo group, a carboxy group, a phosphono group, a sulfate group, hydroxy, mercapto, sulfino group, a carbamoyl group (e.g., carbamoyl, n-methylcarbamoyl, N,N-tetramethylenecarbamoyl), a sulfamoyl group (e.g., sulfamoyl, N,N-3-oxapentamethylenaminosulfonyl), a sulfonamido group (e.g., methanesulfonamido, butanesulfoneamido), a sulfonylaminocarbonyl group (e.g., methanesulfonylaminocarbonyl, ethanesulfonylaminocarbonyl), an acylaminosulfonyl group (e.g., acetoamidosulfonyl, methoxyacetoamidosulfonyl), an acylaminocarbonyl group (e.g., acetoamidocarbonyl, methoxyacetoamidocarbonyl), and a sulfinylaminocarbonyl group (e.g., methasulfinylaminocarbonyl, ethanesulfinylaminocarbonyl). Examples of aliphatic groups substituted by a hydrophilic group include carboxymethyl, carboxymethyl, carboxybutyl, carboxypentyl, 3-sulfatobutyl, 3-sulfopropyl, 2-hydroxy-3-sulfopropyl, 4-sulfobutyl, 5-sulfopentyl, 3-sulfopentyl, 3-sulfinobutyl, 3-phosphonopropyl, hydroxyethyl, N-methanesulfonylcarbamoyl-methyl, 2-carboxy-2-propenyl, o-sulfobenzyl, p-sulfobenzyl and p-carboxybenzyl.

The lower alkyl group represented by Ra or Rb include a straight-chained or branched one having 1 to 5 carbon atoms, such as methyl, ethyl, propyl, pentyl and isopropyl. The cycloalkyl group includes, e.g., cyclopropyl, cyclobutyl and cyclopentyl. The aralkyl group includes, e.g., benzyl, phenethyl, p-methoxyphenylmethyl and o-acetylaminophenylethyl; the lower alkoxyl group includes one having 1 to 4 carbon atoms, including methoxy, ethoxy, propoxy and i-propoxy; the aryl group includes substituted or unsubstituted one, such as phenyl, 2-naphthyl, 1-naphthyl, o-tolyl, o-methoxyphenyl, m-chlorophenyl, m-bromophenyl, p-tolyl and p-ethoxyphenyl. These groups may be substituted by a substituent group, such as a phenyl group, a halogen atom (e.g., fluorine atom, chlorine atom, bromine atom, iodine atom), an alkoxyl group or hydroxy.

The lower alkyl group represented by Rc or Rd includes a straight-chained or branched one having 1 to 5 carbon atoms such as methyl, ethyl, propyl, pentyl and isopropyl. The cycloalkyl group includes, e.g., cyclopropyl, cyclobutyl and cyclopentyl. The aralkyl group includes, e.g., benzyl, phenethyl, p-methoxyphenylmethyl and o-acetylaminophenylethyl; the aryl group includes substituted or unsubstituted one, such as phenyl, 2-naphthyl, 1-naphthyl, o-tolyl, o-methoxyphenyl, m-chlorophenyl, m-bromophenyl, p-tolyl and p-ethoxyphenyl; and the heterocyclic group includes substituted or unsubstituted one, such as 2-furyl, 5-methyl-2-furyl, 2-thienyl, 2-imidazolyl, 2-methyl-1-imidazolyl, 4-phenyl-2-thiazolyl, 5-hydroxy-2-benzothiazolyl, 2-pyridyl and 1-pyrrolyl. These groups, as described above, may be substituted by a substituent group, such as a phenyl group, a halogen atom, an alkoxyl group or hydroxy.

Examples of the substituents represented by $W_{21}$ to $W_{24}$ and $W_{31}$ to $W_{34}$ include an alkyl group (e.g., methyl, ethyl, butyl, i-butyl), an aryl group (including monocyclic and polycyclic ones such as phenyl and naphthyl), a heterocyclic group (e.g., thienyl, furyl, pyridyl, carbazolyl, pyrrolyl, indolyl), a halogen atom (e.g., fluorine atom, chlorine atom, bromine atom, iodine atom), a vinyl group, trifluoromethyl, an alkoxyl group (e.g., methoxy, ethoxy, methoxyethoxy), an aryloxyl group (e.g., phenoxy, p-tolyloxy), a sulfonyl group (e.g., methanesulfonyl, p-toluenesulfonyl), an alkoxycarbonyl group (e.g., ethoxycarbonyl, ethoxycarbonyl), an amino group (e.g., amino, biscarboxymethylamino), an acyl group (e.g., acetyl, benzoyl), an ureido group (e.g., ureido, 3-methylureido), a thioureido group (e.g., thioureido, 3-methylthioureido), an alkylthio group (e.g., methylthio, ethylthio), an alkenyl thio group, an arylthio group (e.g., phenylthio), hydroxy and styryl.

These groups may be substituted by the same substituents as described in the aliphatic group represented by $R_{21}$. Examples of substituted alkyl group include 2-methoxyethyl, 2-hydroxyethyl, 3-ethoxycarbonylpropyl, 2-carbamoylethyl, 2-methanesulfonylethyl, 3-methanesulfonylaminopropyl, benzyl, phenethyl, carboxymethyl, carboxymethyl, allyl, and 2-furylethyl. Examples of substituted aryl groups include p-carboxyphenyl, p-N,N-dimethylaminophenyl, p-morpholinophenyl, p-methoxyphenyl, 3,4-dimethoxyphenyl, 3,4-methylenedioxyphenyl, 3-chlorophenyl, and p-nitrophenyl. Further, examples of substituted heterocyclic group include 5-chloro-2-pyridyl, 2-ethoxycarbonyl-2-pyridyl and 5-carbamoyl-2-pyridyl. $W_{21}$ and $W_{22}$, $W_{23}$ and $W_{24}$, $W_{31}$ and $W_{32}$, or $W_{33}$ and $W_{34}$ each pair may combine to form a condensed ring, such as 5- or 6-membered saturated or unsaturated condensed carbon rings, which are further substituted by substituents as described in the aliphatic group.

Among the groups represented by $V_{21}$ to $V_{29}$, and $V_{31}$ to $V_{33}$, the halogen atom includes, e.g., a fluorine atom, chlorine atom, bromine atom and iodine atom; the amino group includes, e.g., amino, dimethylamino, diphenylamino, and methylphenylamino; the alkylthio group includes, e.g., methylthio, ethylthio and benzylthio; the arylthio group includes substituted and unsubstituted ones, such as phenylthio or m-fluorphenylthio; the lower alkyl group -includes straight-chained or branched one having five or less carbon atoms, such as methyl, ethyl, propyl, butyl, pentyl or isopropyl; the lower alkoxyl group includes one having four or less carbon atoms, such as methoxy, ethoxy, propoxy, or iso-propoxy; the aryl group includes substituted and unsubstituted ones, such as phenyl, 2-naphthyl, 1-naphthyl, o-tolyl, o-methoxyphenyl, m-chlorophenyl, m-bromophenyl, p-tolyl, and p-ethoxy phenyl; the aryloxyl group includes substituted and unsubstituted ones, such as phenoxy, p-tolyloxy, and m-carboxyphenyloxy; and the heterocyclic group includes substituted or unsubstituted ones, such as 2-furyl, 5-methyl-2-furyl2-thienyl, 2-imidazolyl, 2-methyl-1-imidazolyl, 4-phenyl-2-thiazolyl, 5-hydroxy-2-benzothiazolyl, 2-pyridyl, and 1-pyrrolyl. These groups may further be substituted by a substituent group, such as a phenyl group, a halogen atom, alkoxyl group, or hydroxy. $V_{21}$ and $V_{23}$, $V_{22}$ and $V_{24}$, $V_{23}$ and $V_{25}$, $V_{24}$ and $V_{26}$, $V_{25}$ and $V_{27}$, $V_{26}$ and $V_{28}$, $V_{27}$ and $V_{29}$, and $V_{31}$ and $V_{33}$ each pair may combine to form a 5- to 7-membered ring, such as a cyclopentene ring, cyclohexene ring, cycloheptene ring, and decalin ring, each of which may further be substituted by a lower alkyl group, lower alkoxyl group or aryl group, as described in R.

In cases where the compound represented by formulas (3) and (4) is substituted by a cationic- or anionic-charged group, a counter ion is formed by an anionic or cationic equivalent to compensate an intramolecular charge. As an ion necessary to compensate the intramolecular charge, which is represented by $X_{21}$ or $X_{31}$, examples of cations include a proton, an organic ammonium ion (e.g., triethylammonium, triethanol-ammonium) and inorganic cations (e.g., cations of lithium, sodium and potassium); and examples of acid anions include halide ions (e.g., chloride ion, bromide ion, iodide ion), p-toluenesulfonate ion, perchlorate ion, tetrafluoroborate ion, sulfate ion, methylsulfate ion, ethylsulfate ion, methanesulfonate ion, trifluoromethanesulfonate ion).

It is not definitely clarified why the use of the infrared sensitizing dyes used in the invention and long-chained polymethine dyes characterized in that a sulfonyl group is substituted for the benzene ring of a benzothiazole ring leads to high sensitivity, reduced fogging and superior storage stability, however, it is supposed to be related to the fact that the sulfonyl-substituted benzothiazole ring contains a sulfur atom which is more hydrophilic and less interaction with silver than a thioether, and electron-withdrawing action lowers the ground state of the dye, resulting in little influence on fogging and leading to advantageous effects such as reduced fogging and improved storage stability. It is further supposed that the polarized structure between oxygen and sulfur atoms advantageously affects interaction between dye molecules, leading to formation of a stabilized dye aggregate.

Exemplary examples of the sensitizing dyes represented by formulas (3) and (4) are shown below, but are not limited to these compounds.

No. 34

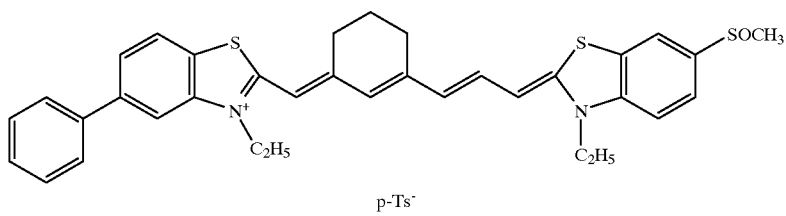

No. 35

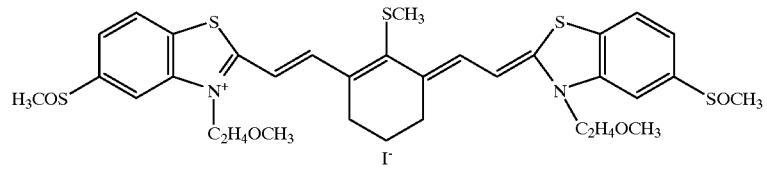

No. 36

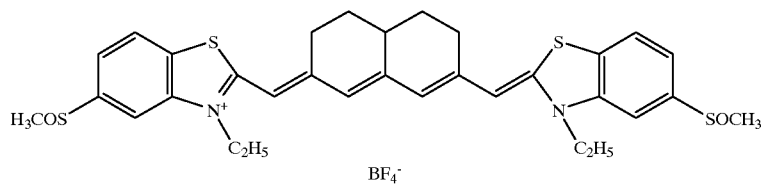

No. 37

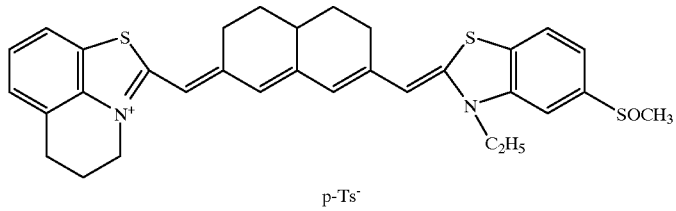

No. 38

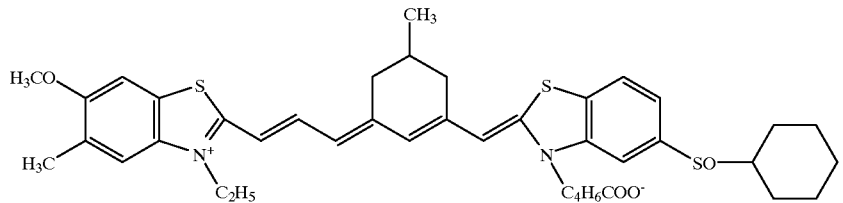

No. 39

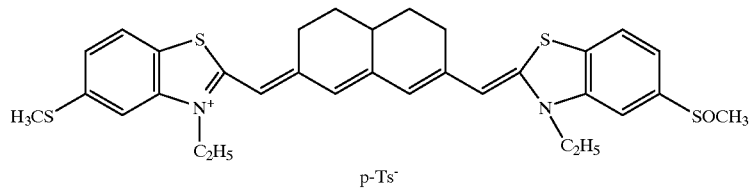

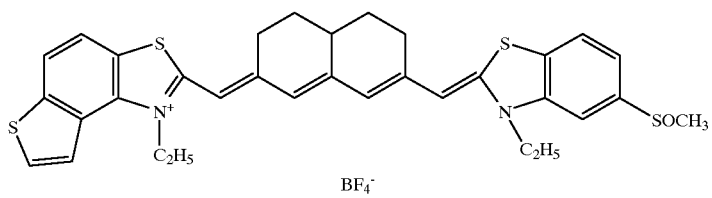
No. 40
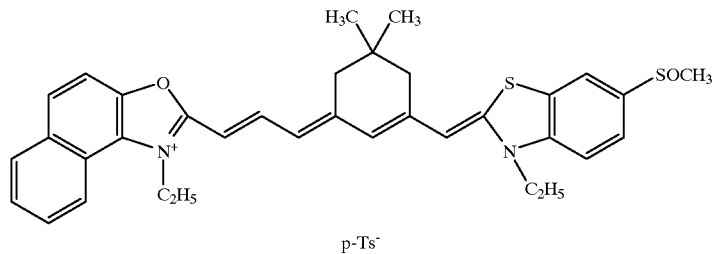
No. 41
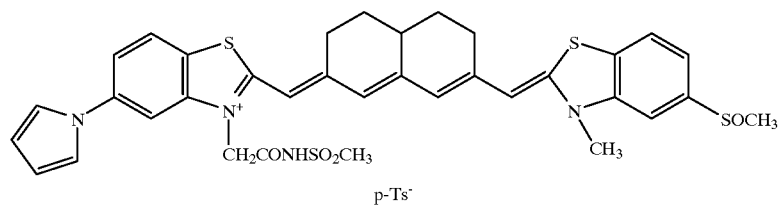
No. 42
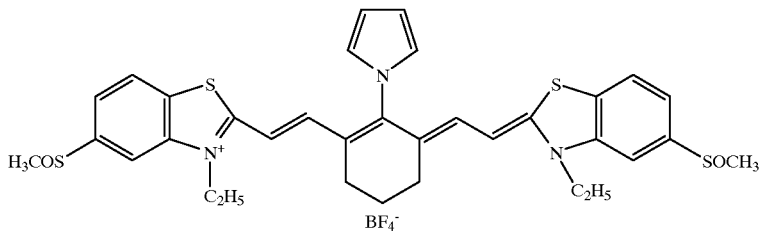
No. 43
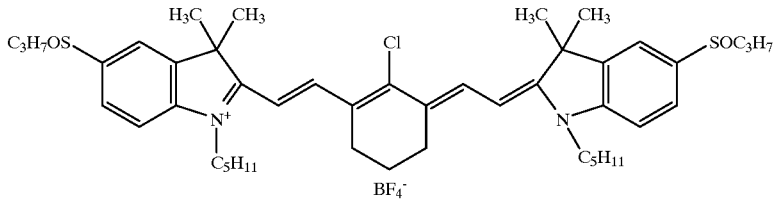
No. 44
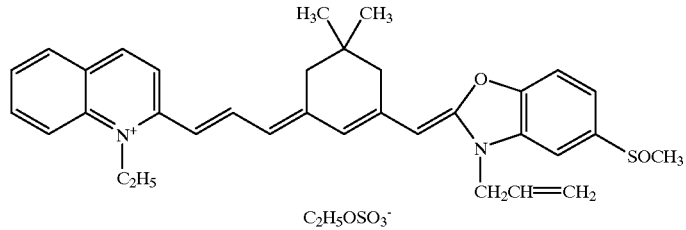
No. 45
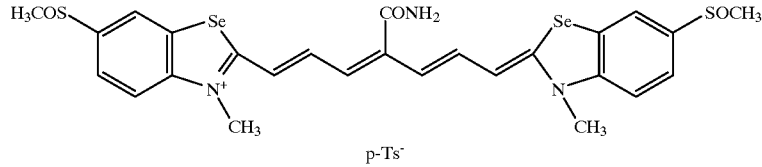
No. 46

No. 47
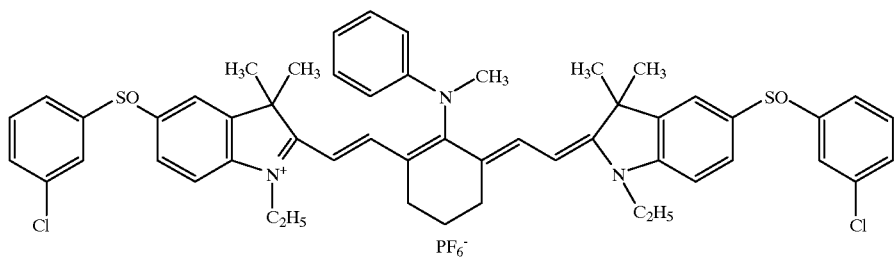
No. 48
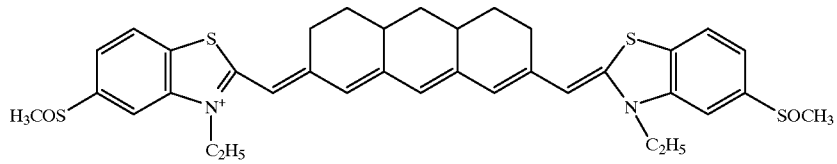
No. 49
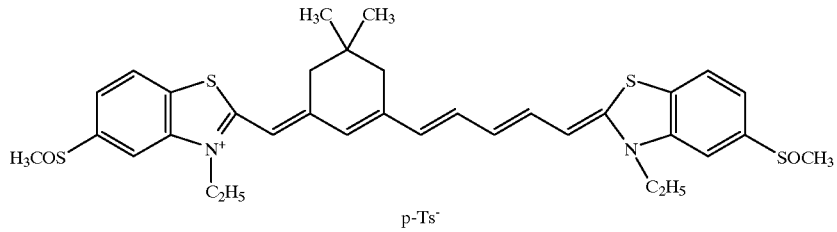
No. 50
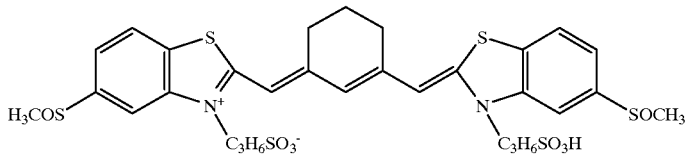
No. 51
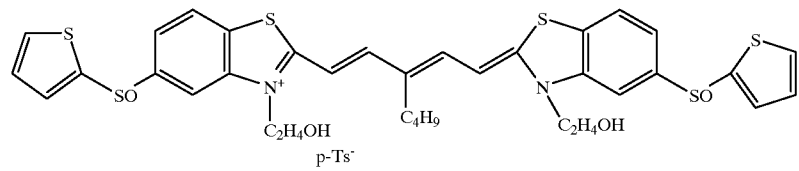
No. 52
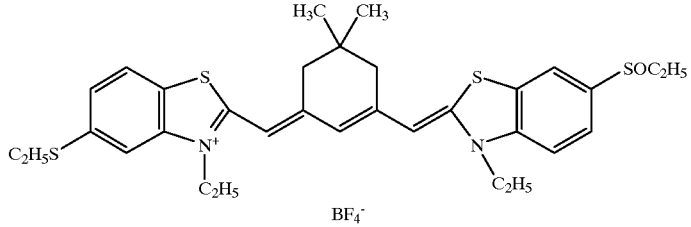
No. 53
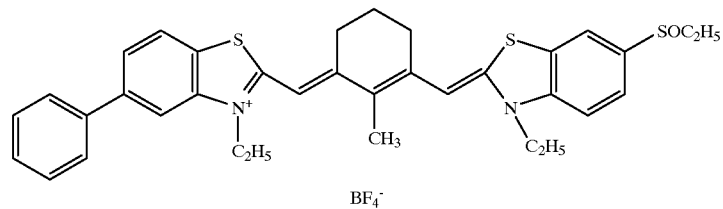

-continued
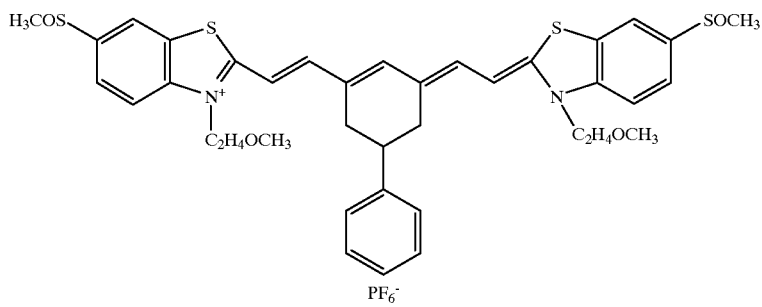
No. 54
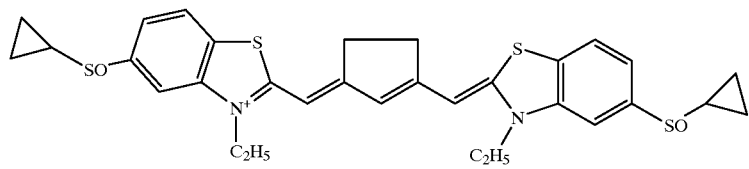
No. 55
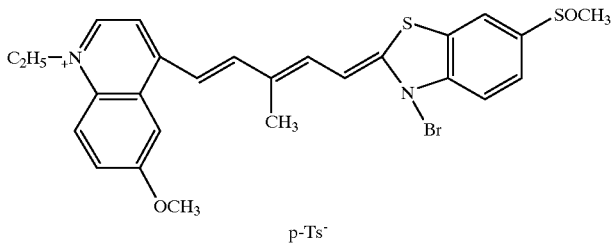
No. 56
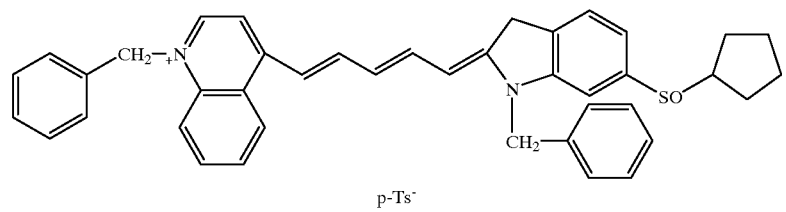
No. 57
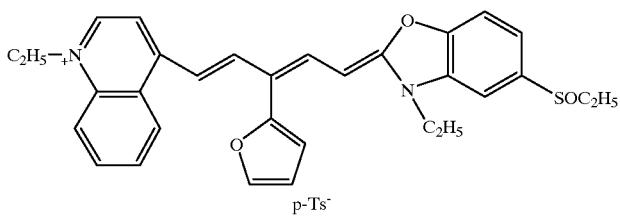
No. 58
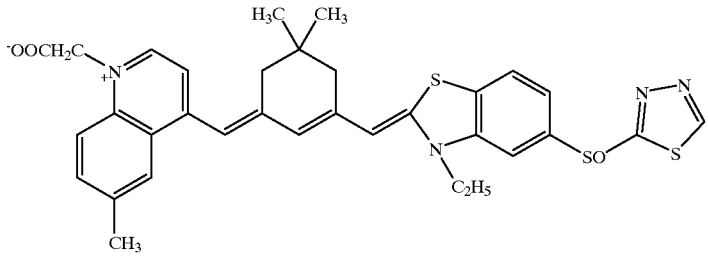
No. 59

-continued

No. 60
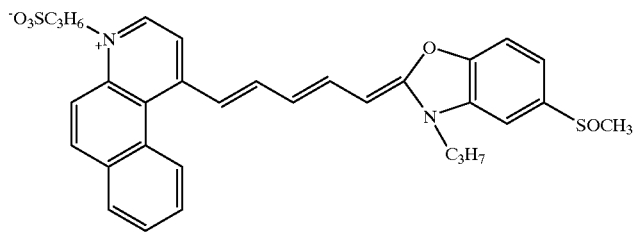

No. 61
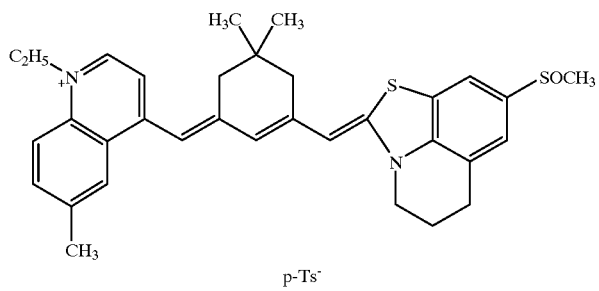

No. 62
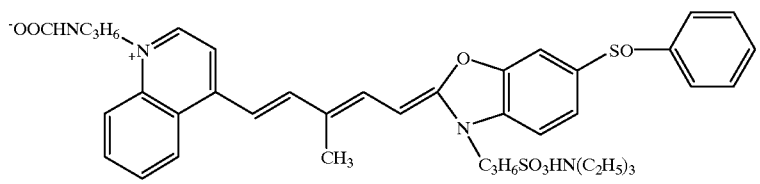

No. 63
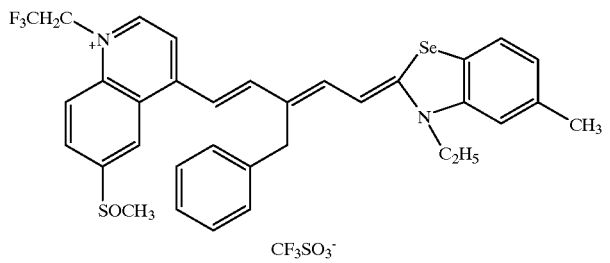

Of the infrared sensitizing dyes represented by the formula (1) to (4) are preferred the dye represented by formula (1) or (3).

The infrared sensitizing dyes and spectral sensitizing dyes described above can be readily synthesized according to the methods described in F. M. Hammer, The Chemistry of Heterocyclic Compounds vol.18, "The cyanine Dyes and Related Compounds" (A. Weissberger ed. Interscience Corp., New York, 1964; JP-A 3-138638, 10-73900, Tokuhyohei 9-510022; U.S. Pat. No. 2,734,900; and British Patent 774,779.

The sensitizing dye used in the invention may be used alone or in combination. In either case when used alone or used in combination, the total amount of the dye(s) to be incorporated is preferably $1 \times 10^{-6}$ to $5 \times 10^{-3}$, more preferably $1 \times 10^{-5}$ to $2.5 \times 10^{-3}$, and still more preferably $4 \times 10^{-5}$ to $1 \times 10^{-3}$ mol per mol of silver halide.

In cases when dyes are used in combination, the dyes can be incorporated in any proportion. The dye may be directly dispersed in a silver halide emulsion. Alternatively, the may be dissolved in an appropriate solvent such as methanol, ethanol, n-propanol, methyl cellosolve, acetone, water, pyridine, or a mixture thereof and added to the emulsion in the form of a solution. Ultrasonic can also be employed. The sensitizing dye can be added in such a manner that a dye is dissolved in a volatile organic solvent, the resulting solution is dispersed in a hydrophilic colloidal medium and the dispersion is added to the emulsion, as described in U.S. Pat. No. 3,469,987; a water-insoluble dye is dispersed in aqueous medium without being dissolved and the dispersion is added to the emulsion, as described in JP-B 46-24185 (hereinafter, the term, JP-B means a published Japanese Patent); a dye is dissolved using a surfactant and the resulting solution is added to the emulsion, as described in U.S. Pat. No. 3,822,135; a dye is dissolved using a compound capable of shifting to longer wavelengths and the solution is added to the emulsion, as described in JP-A 51-74624; or a dye is dissolved in an acid substantially containing no water and the solution is added to the emulsion, as described in JP-A 50-80826. Further, the dye may be added according to the method described in U.S. Pat. No. 2,912,343, 3,342,605, 2,996,287 and 3,492,835. The dye may be homogeneously dispersed in a silver halide emulsion before coating on a support, or may be dispersed at any stage of preparing the silver halide emulsion.

In cases when used in combination, the dyes can be independently or in the form of a mixture dispersed in a silver halide emulsion. Together with the dye(s), a visible region-absorbing dye capable of exhibiting supersensitization, a dye not exhibiting supersensitization, or a compound having no absorption in the visible region may be incorporated into the emulsion. Usable sensitizing dyes and substances exhibiting supersensitization in combination with the dye are described in Research Disclosure (hereinafter, also denoted as "RD") vol. 176, item 17643 (December, 1978) page 23, section IV-J; JP-B 49-15500 and 43-4933; and JP-A 59-19032, 3-15049 and 62-123454.

Photosensitive silver halide emulsions usable in the thermally developable photosensitive materials according to the invention can be prepared according to the methods commonly known in the photographic art, such as single jet or double jet addition, or ammoniacal, neutral or acidic precipitation. Thus, the silver halide emulsion is prepared in advance and then the emulsion is mixed with other components of the invention to be incorporated into the composition used in the invention. To sufficiently bring the photosensitive silver halide into contact with an organic silver salt, there can be applied such techniques that polymers other than gelatin, such as polyvinyl acetal are employed as a protective colloid in the formation of photosensitive silver halide, as described in U.S. Pat. No. 3,706,564, 3,706,5653, 713,833 and 3,748,143, British Patent 1,362,970; gelatin contained in a photosensitive silver halide emulsion is degraded with an enzyme, as described in British Patent 1,354,186; or photosensitive silver halide grains are prepared in the presence of a surfactant to save the use of a protective polymer, as described in U.S. Pat. No. 4,076,539.

Silver halide used in the invention functions as light sensor. Silver halide grains are preferably small in size to R prevent milky-whitening after image formation and obtain superior images. The grain size is preferably not more than 0.1 $\mu$m, more preferably, 0.01 to 0.1 $\mu$m, and still more preferably, 0.02 to 0.08 $\mu$m. The form of silver halide grains is not specifically limited, including cubic or octahedral, regular crystals and non-regular crystal grains in a spherical, bar-like or tabular form. Halide composition thereof is not specifically limited, including any one of silver chloride, silver chlorobromide, silver iodochlorobromide, silver bromide, silver iodobromide, and silver iodide.

Silver halide grains used in the thermally developable photosensitive material are preferably contain iodide, in the vicinity of the grain surface, of 0.1 to 10 mol % on the average, based on the total grains. The average iodide content in the vanity of the grain surface is more preferably 1 to 7 mol %. In the thermally developable photosensitive materials, higher iodide silver halide is preferred in terms of adsorption of a sensitizing dye, as compared to conventional silver halide photographic materials. The average iodide content in the vicinity of the grain surface refers to an average iodide content to a depth of 5 nm from the surface, which can be determined by the XPS method (i.e., X-ray Photoelectron Spectroscopy), according to the following procedure. A sample is cooled to a temperature of not higher than −110° C. under ultra-high vacuum of not more than $1 \times 10^{-8}$ torr, exposed to MgK$\alpha$-line as X-ray for probe at a X-ray source voltage of 15 kV and X-ray source current of 40 mA and measured with respect to Ag3d5/2, Br3d and I3d3/2 electrons. The thus measured integrated peak intensity is corrected with a sensitivity factor and from the obtained intensity ratio can be determined halide composition in the vicinity of the grain surface. Cooling the sample reduces measurement errors, which are due to destruction of the sample occurred when exposed at room temperature, enhancing measurement precision. Cooling to a temperature of −110° C. prevents destruction of the sample at an acceptable level in the measurement.

The amount of silver halide used in the thermally developable photosensitive material is preferably not more than 50%, more preferably 0.1 to 25%, and still more preferably 0.1 to 15%, based on the total amount of silver halide and organic silver salt.

Photosensitive silver halide used in the thermally developable photosensitive material of the invention can be formed simultaneously with the formation of organic silver salt by allowing a halide component such as a halide ion to concurrently be present together with organic silver salt-forming components and further introducing a silver ion thereinto during the course of preparing the organic silver salt.

Alternatively, a silver halide-forming component is allowed to act onto a pre-formed organic silver salt solution or dispersion or a sheet material containing an organic silver salt to convert a part of the organic silver salt to photosensitive silver halide. The thus formed silver halide is effectively in contact with the organic silver salt, exhibiting favorable actions. In this case, the silver halide-forming component refers to a compound capable of forming silver salt upon reaction with the organic silver salt. Such a compound can be distinguished by the following simple test. Thus, a compound to be tested is to be mixed with the organic silver salt, and if necessary, the presence of a peal specific to silver halide can be confirmed by the X-ray diffractometry, after heating. Compounds that have been confirmed to be effective as a silver halide-forming component include inorganic halide compounds, onium halides, halogenated hydrocarbons, N-halogeno compounds and other halogen containing compounds. These compounds are detailed in U.S. Pat. No. 4,009,039, 3,457,075 and 4,003,749, British Patent 1,498,956 and JP-A 53-27027 and 53-25420. Exemplary examples thereof are shown below:

(1) Inorganic halide compound: e.g., a halide compound represented by formula, MXn, in which M represents H, NH4 or a metal atom; n is 1 when M is H or NH4 and a number equivalent to a valence number of the metal atom when M is the metal atom; the metal atom includes lithium, sodium, potassium, cesium, magnesium, calcium, strontium, barium, zinc, cadmium, mercury, tin, antimony, chromium, manganese, cobalt, rhodium, and cerium, and molecular halogen such as aqueous bromine being also effective;

(2) Onium halide: e.g., quaternary ammonium halides such as trimethylphenylammonium bromide, cetylethyldimethylammonium bromide, and trimethylbenzylammonium bromide; and tertiary sulfonium halides such as trimethylsulfonium iodide;

(3) Halogenated hydrocarbons: e.g., iodoform, bromoform, carbon tetrachloride and 2-brom-2-methylpropane;

(4) N-halogeno compounds: e.g., N-chlorosuccinimide, N-bromosucciimde, N-bromophthalimide, N-bromoacetoamide, N-iodosuccinimide, N-bromophthalazinone, N-bromooxazolinone, N-chlorophthalazinone, N-bromoacetoanilide, N,N-dibromobenzenesulfonamide, N-bromo-N-methylbenzenesulfonamide, 1,3-dibromo-4,4-dimethylhydantoin and N-bromourazole;

(5) Other halogen containing compounds: e.g., triphenylmethyl chloride, triphenylmethyl bromide 2-bromoacetic acid, 2-bromoethanol and dichlorobenzophenone.

The silver halide forming component is used stoichiometrically in a small amount per organic silver salt. Thus, it is preferably 0.001 to 0.7 mol, and more preferably 0.03 to 0.5 mol per mol of organic silver salt. The silver halide-forming component may be used in combination. Conditions including a reaction temperature, reaction time and reaction pressure during the process of converting a part of the organic silver salt to silver halide using the silver halide forming component can be appropriately set in accordance with the purpose of preparation. The reaction temperature is preferably −20° C. to 70° C., the reaction time is preferably 0.1 sec to 72 hrs. and the reaction pressure is preferably atmospheric pressure. The reaction is performed preferably in the presence of polymer as a binder, wherein the polymer to be used is preferably 0.01 to 100 weight parts, and more preferably 0.1 to 10 weight parts per 1 weight part of an organic silver salt.

The thus formed photosensitive silver halide can be chemically sensitized with a sulfur containing compound, gold compound, platinum compound, palladium compound, silver compound, tin compound, chromium compound or their combination. The method and procedure for chemical sensitization are described in U.S. Pat. No. 4,036,650, British Patent 1,518,850, JP-A 51-22430, 51-78319 and 51-81124. As described in U.S. Pat. No. 3,980,482, a low molecular weight amide compound may be concurrently present to enhance sensitivity at the time of converting a part of the organic silver salt to photosensitive silver halide.

To improve reciprocity law failure or adjust contrast, the photosensitive silver halide may be contained with metal ions of the 6th group to 10th group in the periodical table, such as Rh, Ru, Re, Ir, Os, Fe and their complexes and complex ions. Specifically, complex ions are preferred, e.g., Ir complex ions such as $IrCl_6^{2-}$ are preferably contained to improve reciprocity law failure.

Organic silver salts used in the invention are reducible silver source, and silver salts of organic acids or organic heteroacids are preferred and silver salts of long chain fatty acid (preferably having 10 to 30 carbon atom and more preferably 15 to 25 carbon atoms) or nitrogen containing heterocyclic compounds are more preferred. Specifically, organic or inorganic complexes, ligand of which have a total stability constant to a silver ion of 4.0 to 10.0 are preferred. Exemplary preferred complex salts are described in RD17029 and RD29963, including organic acid salts (for example, salts of gallic acid, oxalic acid, behenic acid, stearic acid, palmitic acid, lauric acid, etc.); carboxyalkylthiourea salts (for example, 1-(3-carboxypropyl)thiourea, 1-(3-caroxypropyl)-3,3-dimethylthiourea, etc.); silver complexes of polymer reaction products of aldehyde with hydroxy-substituted aromatic carboxylic acid (for example, aldehydes (formaldehyde, acetaldehyde, butylaldehyde, etc.), hydroxy-substituted acids (for example, salicylic acid, benzoic acid, 3,5-dihydroxybenzoic acid, 5,5-thiodisalicylic acid, silver salts or complexes of thiones (for example, 3-(2-carboxyethyl)-4-hydroxymethyl-4-(thiazoline-2-thione and 3-carboxymethyl-4-thiazoline-2-thione), complexes of silver with nitrogen acid selected from imidazole, pyrazole, urazole, 1.2,4-thiazole, and 1H-tetrazole, 3-amino-5-benzylthio-1,2,4-triazole and benztriazole or salts thereof; silver salts of saccharin, 5-chlorosalicylaldoxime, etc.; and silver salts of mercaptides. Of these organic silver salts, silver salts of fatty acids are preferred, and silver salts of behenic acid, arachidinic acid and stearic acid are specifically preferred.

The organic silver salt compound can be obtained by mixing an aqueous-soluble silver compound with a compound capable of forming a complex. Normal precipitation, reverse precipitation, double jet precipitation and controlled double jet precipitation described in JP-A 9-127643 are preferably employed. For example, to an organic acid is added an alkali metal hydroxide (e.g., sodium hydroxide, potassium hydroxide, etc.) to form an alkali metal salt soap of the organic acid (e.g., sodium behenate, sodium arachidinate, etc.), thereafter, the soap and silver nitrate are mixed by the controlled double jet method to form organic silver salt crystals. In this case, silver halide grains may be concurrently present.

In the present invention, organic silver salts have an average grain diameter of 10 $\mu$m or less and are monodispersed. The average diameter of the organic silver salt as described herein is, when the grain of the organic salt is, for example, a spherical, cylindrical, or tabular grain, a diameter of the sphere having the same volume as each of these grains. The average grain diameter is preferably between 0.05 and 10 $\mu$m, more preferably between 0.05 and 5 $\mu$m and still more preferably between 0.05 and 0.5 $\mu$m. Furthermore, the monodisperse as described herein is the same as silver halide grains and preferred monodispersibility is between 1 and 30%.

It is also preferred that at least 60% of the total of the organic silver salt is accounted for by tabular grains. The tabular grains refer to grains having a ratio of an average grain diameter to grain thickness, i.e., aspect ratio (denoted as AR) of 3 or more:

$AR$=average diameter ($\mu$m)/thickness ($\Xi$m)

To obtain such tabular organic silver salts, organic silver salt crystals are pulverized together with a binder or surfactant, using a ball mill. Thus, using these tabular grains, photosensitive materials exhibiting high density and superior image fastness are obtained.

To prevent hazing of the photosensitive material, the total amount of silver halide and organic silver salt is preferably 0.5 to 2.2 g in equivalent converted to silver per $m^2$, leading to high contrast images. The amount of silver halide is preferably 50% by weight or less, more preferably 25% by weight or less, and still more preferably 0.1 to 15% by weight, based on the total silver amount.

Commonly known reducing agents are used in thermally developable photosensitive materials, including phenols, polyphenols having two or more phenols, naphthols, bisnaphthols, polyhydoxybenzenes having two or more hydroxy groups, polyhydoxynaphthalenes having two or more hydroxy groups, ascorbic acids, 3-pyrazolidones, pyrazoline-5-ones, pyrazolines, phenylenediamines, hydroxyamines, hydroquinone monoethers, hydrooxamic acids, hydrazides, amidooximes, and N-hydroxyureas. Further, exemplary examples thereof are described in U.S. Pat. No. 3,615,533, 3,679,426, 3,672,904, 3,51,252, 3,782, 949, 3,801,321, 3,794,488, 3,893,863, 3,887,376, 3,770,448, 3,819,382, 3,773,512, 3,839,048, 3,887,378, 4,009,039, and 4,021,240; British Patent 1,486,148; Belgian Patent 786, 086; JP-A 50-36143, 50-36110, 50-116023, 50-99719, 50-140113, 51-51933, 51-23721, 52-84727; and JP-B 51-35851.

Of these reducing agents, in cases where fatty acid silver salts are used as an organic silver salt, preferred reducing agents are polyphenols in which two or more phenols are linked through an alkylene group or a sulfur atom, specifically, polyphenols in which two or more phenols are linked through an alkylene group or a sulfur atom and the phenol(s) are substituted at least a position adjacent to a hydroxy group by an alkyl group (e.g., methyl, ethyl, propyl, t-butyl, cyclohexyl) or an acyl group (e.g., acetyl, propionyl). Examples thereof include polyphenols compounds such as 1,1-bis(2-hydroxy-3,5-dimethylphenyl)-3,5, 5-trimethylhexane, 1,1-bis(2-hydroxy-3-t-butyl-5 -methyphenyl)methane, 1,1-bis(2-hydroxy-3,5-di-t-butylphenyl)methane, 2-hydroxy-3-t-butyl-5-methylphenyl)-(2-hydroxy-5-methylphenyl)methane, 6,6'-benzylidene-bis(2,4-di-t-butylphenol), 6,6'-benzylidene-bis (2-t-butyl-4-methylphenol), 6,6'-benzylidene-bis(2,4-dimethylphenol), 1,1-bis(2-hydroxy-3,5-dimethylphenyl)-2-methylpropane, 1,1,5,5-tetrakis(2-hydroxy-3,5-dimethylphenyl)-2,4-ethylpentane, 2,2-bis(4-hydroxy-3,5-dimethylphenyl)propane, 2,2-bis(4-hydroxy-3,5-di-t-butylphenyl)propane, as described in U.S. Patent 3,589,903 and 4,021,249, British Patent 1,486,148, JP-A 51-51933, 50-36110 and 52-84727 and JP-B 51-35727; bisnaphthols described in U.S. Pat. No. 3,672,904, such as 2,2'dihydroxy-1,1'-binaphthyl, 6,6'-dibromo-2,2'-dihydroxy-1,1'-binaphthyl, 6,6'-dinitro-2,2'-dihydroxy-1,1'-binaphtyl, bis (2-hydroxy-1-naphthyl)methane, 4,4'-dimethoxy-1,1'-dihydroxy-2,2'-binaphthyl; sulfonamidophenols or sulfonamidonaphthols described in U.S. Pat. No. 3,801,321, such as 4-benzenesulfonamidophenol, 2-benzenesulfonamidophenol, 2,6-dichloro-4-benzenesulfonamidophenol and 4-benzenesulfonamidonaphthol.

The amount of the reducing agent to be used in the thermally developable photosensitive material, depending on the kind of an organic silver salt or reducing agent is preferably 0.05 to 10 mol, and more preferably 0.1 to 3 mol per mol of organic silver salt. Two or more kinds of reducing agents may be used in combination within the amount described above. It is also preferred to add the reducing agent to a photosensitive coating solution immediately before coating, in terms of reduced variation in photographic performance occurred during standing.

Thermally developable photosensitive materials form images through thermal development and comprise a reducible silver source (organic silver salt), a photosensitive silver halide, a reducing agent and optionally a toning agent for silver images, which are preferably dispersed in a (organic) binder matrix. The thermally developable photosensitive material according to the invention, which is stable at ordinary temperatures, is exposed and then heated at a high temperature (e.g., 80–140° C.) to undergo development. Thus, silver is formed on heating through oxidation-reduction reaction between an organic silver salt (functioning as an oxidizing agent) and a reducing agent. The oxidation-reduction reaction is catalytically accelerated by a latent image produced in silver halide upon exposure. Silver formed through reaction of the organic silver salt in exposed areas provides black images contrasting to non-exposed areas, performing image formation. This reaction process proceeds without supplying a processing solution such as water from the outside.

Image toning agents are preferably incorporated into the thermally developable photosensitive material used in the present invention. Examples of preferred image toning agents are disclosed in Research Disclosure Item 17029, and include the following:

imides (for example, phthalimide), cyclic imides, pyrazoline-5-one, and quinazolinone (for example, succinimide, 3-phenyl-2-pyrazoline-5-on, 1-phenylurazole, quinazoline and 2,4-thiazolidione); naphthalimides (for example, N-hydroxy-1,8-naphthalimide); cobalt complexes (for example, cobalt hexaminetrifluoroacetate), mercaptans (for example, 3-mercapto-1,2,4-triazole); N-(aminomethyl) aryldicarboxyimides (for example, N-(dimethylaminomethyl)phthalimide); blocked pyrazoles, isothiuronium derivatives and combinations of certain types of light-bleaching agents (for example, combination of N,N'-hexamethylene(1-carbamoyl-3,5-dimethylpyrazole), 1,8-(3,6-dioxaoctane)bis-(isothiuroniumtrifluoroacetate), and 2-(tribromomethylsulfonyl)benzothiazole; merocyanine dyes (for example, 3-ethyl-5-((3-etyl-2-benzothiazolinylidene-(benzothiazolinylidene))-1-methylethylidene-2-thio-2,4-oxazolidinedione); phthalazinone, phthalazinone derivatives or metal salts thereof (for example, 4-(1-naphthyl)phthalazinone, 6-chlorophthalazinone, 5,7-dimethylphthalazinone, and 2,3-dihydro-1,4-phthalazinedione); combinations of phthalazinone and sulfinic acid derivatives (for example, 6-chlorophthalazinone and benzenesulfinic acid sodium, or 8-methylphthalazinone and p-trisulfonic acid sodium); combinations of phthalazine and phthalic acid; combinations of phthalazine (including phthalazine addition products) with at least one compound selected from maleic acid anhydride, and phthalic acid, 2,3-naphthalenedicarboxylic acid or o-phenylenic acid derivatives and anhydrides thereof (for example, phthalic acid, 4-methylphthalic acid, 4-nitrophthalic acid, and tetrachlorophthalic acid anhydride); quinazolinediones, benzoxazine, naphthoxazine derivatives, benzoxazine-2,4-diones (for example, 1,3-benzoxazine-2,4-dione); pyrimidines and asymmetry-triazines (for example, 2,4-dihydroxypyrimidine), and tetraazapentalene derivatives (for example, 3,6-dimercapto-1,4-diphenyl-lH, 4H-2,3a,5,6a-tatraazapentalene). Preferred image color control agents include phthalazone or phthalazine.

An antifogging halogenated compound is preferably incorporated to bleach silver microcluster causing fog during preparation or storage of the thermally developable photosensitive material. Commonly known compounds bleaching silver microcluster are applicable to the present invention. Specifically, an aromatic compound substituted with at least one halogenated group is preferred, as represented by the following formula:

Formula (5)

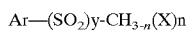

where y is 0 or 1, X is a halogen atom, n is 1,2 or 3 and Ar is an aromatic hydrocarbon group or an aromatic heterocyclic group. The compounds represented by formula (5) are exemplarily detailed in U.S. Pat. No. 4,546,075, 4,756,999, 4,452,885, 3,874,946 and 3,955,982. Other useful Halogenated antifogging compounds, such as di-halogenated compounds are also described in JP-A 59-57234. The antifogging Halogenated compound is preferably incorporated into a silver layer or top layer in an amount of $5 \times 10^{-4}$ to 0.5 mol, and more preferably $5 \times 10^{-3}$ to $5 \times 10^{-2}$ mol per mol of total silver.

The antifogging Halogenated compound may be used in combination with an isocyanate compound described in JP-A 6-208193, an aziridine compound described in U.S. Pat. No. 3,017,280 and JP-A 9-5916, and an epoxy compound described in JP-A 10-186561 and 9-5916, thereby enhancing antifogging effects. The combined use of a carbodiimide compound described in U.S. Pat. No. 3,100,704 is also effective, though its effect is less than that of the compounds described above. The antifogging compounds such as the isocyanate or epoxy compound is used preferably in an amount of 0.002 to 2 mol, and more preferably 0.03 to 0.3 mol per mol of silver.

Binders suitable for the thermally developable photosensitive material to which the present invention is applied are transparent or translucent, and generally colorless. Binders are natural polymers, synthetic resins, and polymers and copolymers, other film forming media; for example, gelatin, gum arabic, poly(vinyl alcohol), hydroxyethyl cellulose, cellulose acetate, cellulose acetatebutylate, poly(vinyl pyrrolidone), casein, starch, poly(acrylic acid), poly(methyl methacrylic acid), poly(vinyl chloride), poly(methacrylic acid), copoly(styrene-maleic acid anhydride), copoly (styrene-acrylonitrile, copoly(styrene-butadiene, poly(vinyl acetal) series [e.g., poly(vinyl formal) and poly(vinyl butyral), polyester series, polyurethane series, phenoxy resins, poly(vinylidene chloride), polyepoxide series, polycarbonate series, poly(vinyl acetate) series, cellulose esters, poly(amide) series. Of these binders are preferred aqueous-insoluble polymers such as cellulose acetate, cellulose acetate-butylate and poly(vinyl butyral); and poly(vinyl formal) and poly(vinyl butyral) are specifically preferred as a polymer used in the thermally developable photosensitive layer; and cellulose acetate and cellulose acetate-butylate are preferably used in a protective layer and backing layer.

The amount of the binder in a photosensitive layer is preferably between 1.5 and 6 g/m, and is more preferably between 1.7 and 5 g/m². The binder content of less than 1.5 g/m² tends to increase a density of unexposed area to levels unacceptable to practical use.

In the present invention, a matting agent is preferably incorporated into the image forming layer side. In order to minimize the image abrasion after thermal development, the matting agent is provided on the surface of a photosensitive material and the matting agent is preferably incorporated in an amount of 0.5 to 30 percent in weight ratio with respect to the total binder in the emulsion layer side.

In cases where a non photosensitive layer is provided on the opposite side of the support to the photosensitive layer, it is preferred to incorporate a matting agent into at least one of the non-photosensitive layer (and more preferably, into the surface layer) in an amount of 0.5 to 40% by weight, based on the total binder on the opposite side to the photosensitive layer.

Materials of the matting agents employed in the present invention may be either organic substances or inorganic substances. Examples of the inorganic substances include silica described in Swiss Patent No. 330,158, etc.; glass powder described in French Patent No. 1,296,995, etc.; and carbonates of alkali earth metals or cadmium, zinc, etc. described in U.K. Patent No. 1.173,181, etc. Examples of the organic substances include starch described in U.S. Pat. No. 2,322,037, etc.; starch derivatives described in Belgian Patent No. 625,451, U.K. Patent No. 981,198, etc.; polyvinyl alcohols described in Japanese Patent Publication No. 44-3643, etc.; polystyrenes or polymethacrylates described in Swiss Patent No. 330,158, etc.; polyacrylonitriles described in U.S. Pat. No. 3,079,257, etc.; and polycarbonates described in U.S. Pat. No. 3,022,169.

The shape of the matting agent may be crystalline or amorphous. However, a crystalline and spherical shape is preferably employed. The size of a matting agent is expressed in the diameter of a sphere having the same volume as the matting agent. The particle diameter of the matting agent in the present invention is referred to the diameter of a spherical converted volume. The matting agent employed in the present invention preferably has an average particle diameter of 0.5 to 10 μm, and more preferably of 1.0 to 8.0 μm. Furthermore, the variation coefficient of the size distribution is preferably not more than 50 percent, is more preferably not more than 40 percent, and is most preferably not more than 30 percent. The variation coefficient of the size distribution as described herein is a value represented by the formula described below:

(Standard deviation of particle diameter)/(average particle diameter)×100

The matting agent according to the present invention can be incorporated into any layer. In order to accomplish the object of the present invention, the matting agent is preferably incorporated into the layer other than the photosensitive layer layer, and is more preferably incorporated into the farthest layer from the support.

Addition methods of the matting agent include those in which a matting agent is previously dispersed into a coating composition and is then coated, and prior to the completion of drying, a matting agent is sprayed. When plural matting agents are added, both methods may be employed in combination.

In cases where the thermally developable photosensitive material is specifically employed for the output of a printing image setter with an oscillation wavelength of 600 to 800 nm, hydrazine derivatives are preferably incorporated into the photosensitive material. Exemplary preferred hydrazine compounds are described in RD23515 (November, 1983, page 346), U.S. Pat. No. 4,080,207, 4,269,929, 4,276,364, 4,278,748, 4,385,108, 4,459,347, 4,478,928, 4,560,638, 4,686,167, 4,912,016, 4,988,604, 4,994,365, 5,041,355, and 5,104,769; British Patent 2,011,391B; European Patents 217,310, 301,799 and 356,898; JP-A 60-179734, 61-170733, 61-270744, 62-178246, 62-270948, 63-29751, 63-32538, 63-104047, 63-121838, 63-129337, 63-22374, 63-234244, 63-234245, 63-234246, 63-294552, 63-306438, 64-10233, 1-90439, 1-100530, 1-105041, 1-105943, 1-276128, 1-280747, 1-283548, 1-283549, 1-285940, 2-2541, 2-7057, 2-13958, 2-196234, 2-196235, 2-198440, 2-198441,2-198442, 2-220042, 2-221953, 2-221954, 2-285342, 2-285343, 2-289843, 2-302750, 2-304550, 3-37642, 3-54549, 3-125134, 3-184039, 3-240036, 3-240037, 3-259240, 3-280038, 3-282536, 4-51143, 4-56842, 4-84134, 2-230233, 4-96053, 4-216544, 5-45761, 5-45762, 5-45763, 5-45764, 5-45765, 6-289524, and 9-160164.

Furthermore, other than those, employed can be compounds described in (Ka 1) of Japanese Patent Publication (hereinafter, denoted as JP-B) No. 6-77138, specifically, compounds described on pages 3 and 4 of the Publication; compounds represented by general formula (I) in JP-B No. 6-93082, specifically, compounds 1 through 38 described on pages 8 to 18 of the Publication; compounds represented by general formula (4), general formula (5), and general formula (6) in JP-A No. 6-230497, specifically, compounds 4-1 through 4-10 on pages 25 and 26, compounds 5-1 through 5-42 on pages 28 to 36, and compounds 6-1 through 6-7 on pages 39 and 40 of the Publication; compounds represented by general formula (I) and general formula (2) in JP-A No. 6-289520, specifically, compounds 1-1) through 1-17) and 2-1) on pages 5 to 7 of the Publication; compounds described in (Ka 2) and (Ka 3) of JP-A No. 6-313936, specifically, compounds described on pages 6 to 19 of the Publication; compounds described in (Ka 1) of JP-A No. 6-313951, specifically, compounds described on pages 3 to 5 of the Publication; compounds represented by general formula (I) in JP-A No. 7-5610, specifically, compounds I-1 through I-38 described on pages 5 to 10 of the Publication; compounds represented by general formula (II) in JP-A No. 7-77783, specifically, compounds II-1 through II-102 described on pages 10 to 27 of the Publication; and compounds represented by general formula (H) and general formula (Ha) in JP-A No. 7-104426, specifically, compounds H-1 through H-44 described on pages 8 to 15 of the Publication.

In addition to these materials, a variety of adjuvants may be incorporated into the photosensitive layer, non-photosensitive layer or other layer(s). Exemplarily, a surfactant, an antioxidant, a stabilizer, a plasticizer, a UV absorbent or a coating aid may be incorporated. As these adjuvants and other additives can be used compounds described in RD17029 (June, 1978, page 9–15).

Supports usable in the thermally developable photosensitive materials include various kinds of polymeric materials, glass, wool fabric, cotton fabric, paper, metal (e.g., aluminum) and those which are convertible to flexible sheets or rolls are preferred in terms of handling as information recording material. Preferred supports usable in thermally developable photosensitive materials are plastic resin films (e.g., cellulose acetate film, polyester film, polyethylene terephthalate film, polyethylene naphthalate film, polyamide film, polyimide film, cellulose triacetate film, polycarbonate film) and biaxially stretched polyethylene terephthalate film is specifically preferred. The thickness of the support is preferably 50 to 300 Km, and more preferably 70 to 180 μm.

In the present invention, to improve an electrification property, a conducting compound such as a metal oxide and/or a conducting polymer can be incorporated into a construction layer. These compounds can be incorporated into any layer, preferably into a sublayer, a backing layer and an intermediate layer between a photosensitive layer and a sublayer, etc. In the present invention, the conducting compounds described in U.S. Pat. No. 5,244,773, column 14 through 20, are preferably used.

The coating method of the photosensitive layer, protective layer and backing layer is not specifically limited. Coating can be conducted by any method known in the art, including air knife, dip-coating, bar coating, curtain coating, and hopper coating. Two or more layers can be simultaneously coated. As a solvent for coating solution are employed organic solvents such as methyl ethyl ketone (also denoted as MEK), ethyl acetate and toluene.

The thermally developable photosensitive material according to the invention comprises a support having thereon a photosensitive layer, and preferably further on the photosensitive layer having a non-photosensitive layer. For example, it is preferred that a protective layer is provided on the photosensitive layer to protect the photosensitive layer and that a back coating layer is provided on the opposite side of the support to the photosensitive layer to prevent adhesion between photosensitive materials or sticking of the photosensitive material to a roller. Further, there may be provided a filter layer on the same side or opposite side to the photosensitive layer to control the amount or wavelengths of light transmitting the thermally developable photosensitive layer. Alternatively, a dye or pigment may be incorporated into the photosensitive layer. In this case, dyes described in JP-A 8-201959 are preferably used therein. The photosensitive layer may be comprised of plural layers. To adjust contrast, a high speed layer and low speed layer may be provided in combination. Various adjuvants may be incorporated into the photosensitive layer, non-photosensitive layer or other component layer(s).

The thermally developable photosensitive material, which is stable at ordinary temperatures, is exposed and heated at a high temperature (preferably 80 to 200° C., and more preferably 100 to 150° C.) to undergo development. In cases when heated at a temperature of lower than 80° C., sufficient image density can be obtained within a short time. Further, in cases when heated at a temperature of higher than 200° C., a binder melts and is transferred to a roller, adversely affecting not only images but also transportability and a developing machine. The organic silver salt (functioning as an oxidant) and the reducing agent undergo oxidation-reduction reaction upon heating to form silver images. The reaction process proceeds without supplying any processing solution such as water.

It is preferred that when subjected to thermal development, the thermally developable photosensitive material contains an organic solvent. Examples of solvents include ketones such as acetone, isophorone, ethyl amyl ketone, methyl ethyl ketone, methyl isobutyl ketone; alcohols such as methyl alcohol, ethyl alcohol, n-propyl alcohol, isopropyl alcohol, n-butyl alcohol, isobutyl alcohol, diacetone alcohol, cyclohexanol, and benzyl alcohol; glycols such as ethylene glycol, dimethylene glycol, triethylene glycol, propylene glycol and hexylene glycol; ether alcohols such as ethylene glycol monomethyl ether, and dimethylene-glycol monomethyl ether; ethers such as ethyl ether, dioxane, and isopropyl ether; esters such as ethyl acetate, butyl acetate, amyl acetate, and isopropyl acetate; hydrocarbons such as n-pentane, n-hexane, n-heptane, cyclohexene, benzene, toluene, xylene; chlorinated compounds such as chloromethyl, chloromethylene, chloroform, and dichlorobenzene; amines such as monomethylamine, dimethylamine, triethanol amine, ethylenediamine, and triethylamine; and water, formaldehyde, dimethylformaldehyde, nitromethane, pyridine, toluidine, tetrahydrofuran and acetic acid. The solvents are not to be construed as limiting these examples. These so;vents may be used alone or in combination.

The solvent content in the photosensitive material can be adjusted by varying conditions such as temperature conditions at the drying stage after the coating stage. The solvent content can be determined by means of gas chromatography under the conditions suitable for detecting the solvent. The total solvent content (based on weight) of the thermally developable photosensitive material used in the invention is preferably adjusted to be 40 to 4500 ppm, and more preferably 100 to 4000 ppm (based on the weight of constituting components of the photosensitive material, except for a support). The solvent content within the range described above leads to a thermally developable photosensitive material with low fog density as well as high sensitivity.

Any light source within the infrared region is applicable to exposure of the thermally developable photosensitive material, and infrared semiconductor lasers (780 nm, 820 nm) are preferred in terms of high power and transmission capability through the photosensitive material.

In the invention, exposure is preferably conducted by laser scanning exposure. It is also preferred to use a laser exposure apparatus, in which a scanning laser light is not exposed at an angle substantially vertical to the exposed surface of the photosensitive material. The expression "laser light is not exposed at an angle substantially vertical to the exposed surface" means that laser light is exposed preferably at an angle of 55 to 880, more preferably 60 to 860, still more preferably 65 to 840, and optimally 70 to 820. When the photosensitive material is scanned with laser light, the beam spot diameter on the surface of the photosensitive material is preferably not more than 200 $\mu$m, and more preferably not more than 100 $\mu$m. Thus, a smaller spot diameter preferably reduces the angle displacing from verticality of the laser incident angle. The lower limit of the beam spot diameter is 10 $\mu$m. The thus laser scanning exposure can reduce deterioration in image quality due to reflected light, resulting in occurrence such as interference fringe-like unevenness.

Exposure applicable in the invention is conducted preferably using a laser scanning exposure apparatus producing longitudinally multiple scanning laser beams, whereby deterioration in image quality such as occurrence of interference fringe-like unevenness is reduced, as compared to a scanning laser beam of the longitudinally single mode. Longitudinal multiplication can be achieved by a technique of employing backing light with composing waves or a technique of high frequency overlapping. The expression "longitudinally multiple" means that the exposure wavelength is not a single wavelength. The exposure wavelength distribution is usually not less than 5 nm and not more than 10 nm. The upper limit of the exposure wavelength distribution is not specifically limited but is usually about 60 nm.

EXAMPLES

The present invention will be further described based on examples but embodiments of the invention are by no means limited to these examples.

Example 1

Preparation of a Subbed PET Photographic Support

Both surfaces of a biaxially stretched thermally fixed 100 $\mu$m PET film, available on the market, was subjected to corona discharging at 8 w/m$^2$ min. Onto the surface of one side, the subbing coating composition a-1 descried below was applied so as to form a dried layer thickness of 0.8 gm, which was then dried. The resulting coating was designated Subbing Layer A-1. Onto the opposite surface, the subbing coating composition b-1 described below was applied to form a dried layer thickness of 0.8 $\mu$m. The resulting coating was designated Subbing Layer B-1.

Subbing Coating Composition a-1

| | |
|---|---|
| Latex solution (solid 30%) of a copolymer consisting of butyl acrylate (30 weight %), t-butyl acrylate (20 weight %) styrene (25 weight %) and 2-hydroxy ethyl acrylate (25 weight %) | 270 g |
| (C-1) | 0.6 g |
| Hexamethylene-1,6-bis(ethyleneurea) | 0.8 g |
| Water to make | 1 liter |

Subbing Coating Composition b-1

| | |
|---|---|
| Latex liquid (solid portion of 30%) of a copolymer consisting of butyl acrylate (40 weight %) styrene (20 weight %) glycidyl acrylate (25 weight %) | 270 g |
| (C-1) | 0.6 g |
| Hexamethylene-1,6-bis(ethyleneurea) | 0.8 g |
| Water to make | 1 liter |

Subsequently, the surfaces of Subbing Layers A-1 and B-1 were subjected to corona discharging with 8 w/m$^2$·minute. Onto the Subbing Layer A-1, the upper subbing layer coating composition a-2 described below was applied so as to form a dried layer thickness of 0.8 $\mu$m, which was designated Subbing Layer A-2, while onto the Subbing Layer B-1, the upper subbing layer coating composition b-2 was applied so at to form a dried layer thickness of 0.8 $\mu$m, having a static preventing function, which was designated Subbing Upper Layer B-2.

Upper Subbing Layer Coating Composition a-2

| | |
|---|---|
| Gelatin in an amount (weight) to make 0.4 g/m² | |
| (C-1) | 0.2 g |
| (C-2) | 0.2 g |
| (C-3) | 0.1 g |
| Silica particles (av. size 3 μm) | 0.1 g |
| Water to make | 1 liter |

Upper Subbing Layer Coating Composition b-2

| | |
|---|---|
| (C-4) | 60 g |
| Latex solution (solid 20% comprising) (C-5) as a substituent | 80 g |
| Ammonium sulfate | 0.5 g |
| (C-6) | 12 g |
| Polyethylene glycol (average molecular weight of 600) | 6 g |
| Water to make | 1 liter |

(C-1)

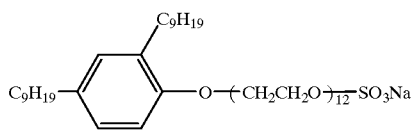

(C-2)

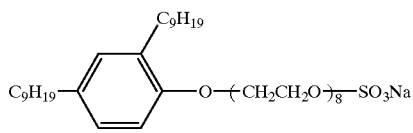

(C-3)

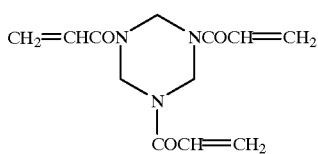

(C-4)

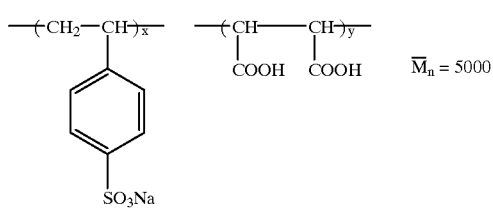

($\overline{M}_n$ is a number average molecular weight)
x:y = 75:25 (weight ratio)

(C-5)

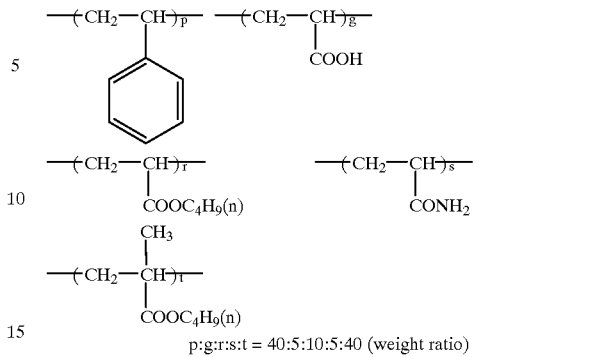

p:g:r:s:t = 40:5:10:5:40 (weight ratio)

(C-6)

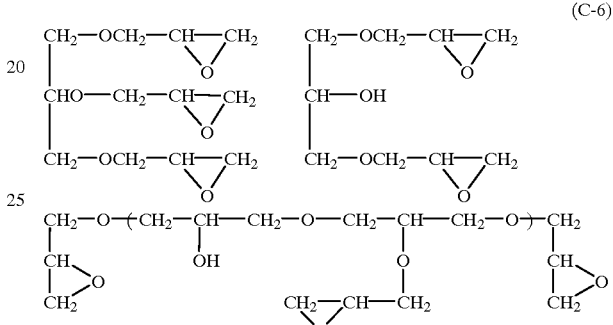

Mixture consisting of the three compounds illustrated above

Thermal Treatment of Support

The subbed support was dried at 140° C. in the process of subbing and drying a support.

Preparation of Backing Coat Composition

To 830 g of methyl ethyl ketone, 84.2 g of cellulose acetate-butylate (CAB381-20, available from Eastman Chemical Co.) and 4.5 g of polyester resin (Vitel PE2200B, available from Bostic Corp.) was added with stirring and dissolved therein. To the resulting solution was added 0.30 g of infrared dye 1 (which was the same as used in the photosensitive layer described later) and 4.5 g fluorinated surfactant (Surflon KH40, available from ASAHI Glass Co. Ltd.) and 2.3 g fluorinated surfactant (Megafag F120K, available from DAINIPPON INK Co. Ltd.) which were dissolved in 43.2 g methanol, were added thereto and sirred until being dissolved. Then, 75 g of silica (Siloid 64×6000, available from W.R. Grace Corp.), which was dispersed in methyl ethyl keton in a concentration of 1 wt % using a dissolver type homogenizer, was further added thereto with stirring to obtain a coating composition for backing layer.

Coating of Backing Layer

The thus prepared coating composition for a backing layer was coated by an extrusion coater and dried so as to have dry thickness of 3.5 μm and dried at a dry-bulb temperature of 100° C. and a wet-bulb temperature of 10° C. over a period of 5 min.

Photosensitive Layer

Preparation of Photosensitive Silver Halide Emulsion a

In 900 ml of deionized water were dissolved 7.5 g of gelatin having an average molecular weight of 100,000 and 10 mg of potassium bromide. After adjusting the temperature and the pH to 35° C. and 3.0, respectively, 370 ml of an aqueous solution containing 74 g silver nitrate and an equimolar aqueous solution containing potassium bromide, potassium iodide (in a molar ratio of 98 to 2) and $1\times10^{-4}$ mol/mol Ag of iridium chloride were added over a period of 10 minutes by the controlled double-jet method, while the pAg was maintained at 7.7. Thereafter, 4-hydroxy-6-methyl-1,3,3a,7-tetraazaindene was added and the pH was adjusted to 5 using NaOH. There was obtained cubic silver iodobromide grains having an average grain size of 0.06 μm, a variation coefficient of the projection area equivalent diameter of 10 percent, and the proportion of the {100} face of 87 percent. The resulting emulsion was flocculated to remove soluble salts, employing a flocculating agent and after desalting, 0.1 g of phenoxyethanol was added and the pH and pAg were adjusted to 5.9 and 7.5, respectively to obtain silver halide emulsion a. The thus obtained photosensitive emulsion grains were measured with respect to the average iodide content in the vicinity of the grain surface and it was proved to be 4.0 mol %.

Preparation of Powdery Organic Silver Salt

In 4720 ml water were dissolved 111.4 g of behenic acid, 83.8 g of arachidic acid and 54.9 g of stearic acid at 80° C. Then, after adding 540.2 ml of 1.5M aqueous sodium hydroxide solution with stirring and further adding 6.9 ml of concentrated nitric acid, the solution was cooled to a temperature of 55° C. to obtain an aqueous organic acid sodium salt solution. To the solution were added the silver halide emulsion obtained above (equivalent to 0.038 mol silver) and 450 ml water and stirring further continued for 5 min., while maintained at a temperature of 55° C. Subsequently, 760 ml of 1M aqueous silver nitrate solution was added in 2 min. and stirring continued further for 20 min., then, the reaction mixture was filtered to remove aqueous soluble salts. Thereafter, washing with deionized water and filtration were repeated until the filtrate reached a conductivity of 2 μS/cm, and after subjecting to centrifugal dehydration, the reaction product was dried with heated air at 37° C. until no reduction in weight was detected to obtain powdery organic silver salt a.

Preparation of Photosensitive Emulsion dispersing Solution

In 1457 g methyl ethyl ketone was dissolved 14.57 g of polyvinyl butyral powder (Butvar B-79, available from Monsanto Corp.) and further thereto was gradually added 500 g of the powdery organic silver salt with stirring by a dissolver type homogenizer. Thereafter, the mixture was dispersed using a media type dispersion machine (available from Gettzmann Corp.), which was packed 1 mm Zr beads (available from Toray Co. Ltd.) by 80%, at a circumferential speed of 13 m and for 0.5 min. of a retention time with a mill to obtain photosensitive emulsion dispersing solution 1.

Preparation of Infrared Sensitizing Dye Solution

In 73.4 ml methanol were dissolved 350 mg of infrared sensitizing dye Dye-C or an equimolar amount of an infrared sensitizing dye as shown in Table 1, 4.65 g of 2-chlorobenzoic acid, 9.30 g of benzoic acid 1 (o-tolylsulfonyloxybenzoic acid) and 2.14 g of 5-methyl-2-mercaptobenzimidazole in a dark room to obtain an infrared sensitizing dye solution.

Preparation of Photosensitive Layer Coating Composition

The photosensitive emulsion dispersing solution 1 of 500 g and 100 g MEK were maintained at 210 C with stirring.

Then, 0.45 g antifoggant 1 was added and stirred for 1 hr. and calcium bromide (3.25 ml of 10% methanol solution) was added and further stirred for 30 min. Subsequently, a macrocyclic compound as shown in Table 1 was added thereto in an equimolar amount to the sensitizing dye and stirred for 10 min. The sensitizing dye solution prepared above was added thereto and stirred for 1 hr. and after cooling to a temperature of 130 C, stirring further continued for 30 min. Further, 48 g of polyvinyl butyral was added thereto and sufficiently dissolved, while maintaining the temperature at 13° C.; then, the following additives were added.

| | |
|---|---|
| Stabilizer 1 | 0.20 g |
| Developer [1,1-bis(2-hydroxy-3,5-dimethylphenyl)-2-methylpropane] | 15 g |
| Antifoggant 2 | 0.5 g |
| Desmodu N3300 (aliphatic isocyanate, available from Movey Corp.) | 1.10 g |
| Phthalazine | 1.5 g |
| Tetrachlorophthalic acid | 0.5 g |
| 4-Methylphthalic acid | 0.5 g |
| Infrared dye 1 | 0.30 g |

Dye-C

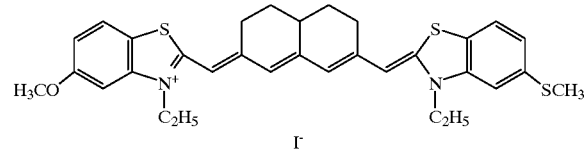

Stabilizer 1

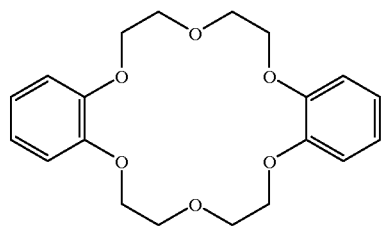

Antifoggant 1

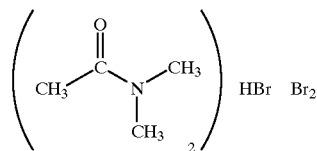

-continued

Antifoggant 2

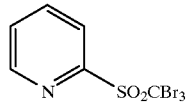

Infrared dye 1

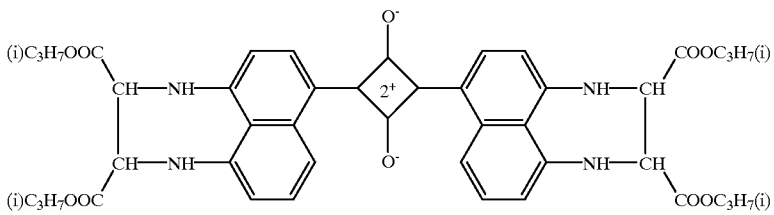

Surface protective Layer
Preparation of Dispersion

In 42.5 g methyl ethyl ketone was dissolved 15 g of cellulose acetate-butylate (CAB171-15, available from Eastman Chemical Co.) and then 5 g of calcium carbonate (Super-Pflex 200, available from Speciality Mineral Corp.) was added thereto and dispersed using a dissolver type homogenizer at a speed of 800 rpm over a period of 30 min. to obtain calcium carbonate dispersion.

Preparation of Coating Composition for Protective Layer

To 865 g of methyl ethyl ketone were added with stirring 96 g of cellulose acetate-butylate (CAB171-15, available from Eastman Chemical Co.) and 4.5 g of polymethyl methacrylate (Paraloid A-21, available from Rohm & Haas Corp.). Further thereto were added and dissolved 1.5 g of vinylsulfon compound HD-1, 1.0 g of benzotriazole and 1.0 g of fluorinated surfactant (Surflon KH40, available from ASAHI Glass Co. Ltd.). Finally, 30 g of calcium carbonate dispersion was added and stirred to obtain a coating composition for the surface protective layer.

Coating of Photosensitive Layer and Protective Layer

The prepared coating composition for the photosensitive layer was maintained at a temperature of 13° C. and coated according to the following procedure. Thus, the photosensitive layer coating composition and the protective layer coating composition described above were simultaneously coated by means of an extrusion coater at a speed of 20 m/min so that the silver coverage of the photosensitive layer was 2.0 g/m$^2$ and dry thickness of the protective layer was 2.5 μm. Thereafter, drying was conducted using hot-air at a dry-bulb temperature of 75° C. and a wet-bulb temperature of 10° C. over a period of 10 min. Similarly, coated samples were prepared except that a sensitizing dye and a macrocyclic compound were varied as shown in Table 1. Thus obtained coat samples are shown in Table 1.

Measurement of Solvent Content of Film

Film samples were each measured with respect to the solvent content. Thus, sample films each were cut to an area of 46.3 cm$^2$, further finely cut to about 5 mm, contained into a specified Bayern bottle, which was closely packed with septum and aluminum cap, and set to head space sampler HP769 (available Hewlett Pachard Co.), which was connected to gas chromatography (GC) Hewlett Packard type 5971 provided with a hydrogen flame ion detector (FID). Chromatograms were obtained under the measurement conditions including a head space sampler heating temperature of 120° C. for 20 min., a GC-introducing temperature of 150° C., column of DB-624 (available from J & W co.) and temperature-increasing of 45° C. (3 min.) to 100° C. at a rate of 8°/min. Solvents to be measure were methyl ethyl ketone and methanol. A given amount of each solvent, which was further diluted with butanol was contained into a Bayern bottle and subjected to the chromatographic measurement in a manner similar to above. Using a calibration curve prepared from the obtained chromatogram peak area, the solvent content of each film sample was determined. Unless otherwise noted, the solvent content in the film was set to be 100 ppm by adjusting the drying time of coated samples.

Exposure and Development

Samples each were cut to a size of 3.5 cm×15 cm and allowed to stand under the following condition (A) or (B):
  (A) at 23° C. and 55% RH, and for 24 hrs. and
  (B) at 55° C. and 55% RH, and for 72 hrs.

Thereafter, each of aged samples was subjected to laser scanning exposure from the emulsion side using an exposure apparatus having a light source of 800 to 820 nm semiconductor laser of longitudinal multi-mode, which was made by means of high frequency overlapping. In this case, exposure was conducted at an angle between the exposed surface and exposing laser light was 75° and in an atmosphere at a temperature of 23° C. and 50% RH (and as a result, images with superior sharpness were unexpectedly obtained, as compared to exposure at an angle of 90°). Using an automatic processor provided with a heated drum, subsequently, exposed samples were subjected to thermal development at 110° C. for 15 sec., while bringing the protective layer surface of the photosensitive material into contact with the drum surface. The thermal development was conducted in an atmosphere at 23° C. and 50% RH.

Sensitometric Evaluation

Thermally developed samples each were subjected to sensitometry using a densitometer and evaluated with respect to a fog density (i.e., minimum density and denoted as Dmin) and sensitivity. The sensitivity was represented by a relative value of reciprocal of exposure necessary to give a density of Dmin plus 1.0, based on the sensitivity of Sample 1 being 100.

Evaluation of Silver Image Tone

Thermally developed samples were visually evaluated with respect to silver image tone, based on the following criteria:

A: Neutral tone and commercially acceptable levels

B: Slightly yellowish but commercially acceptable levels and

C: Yellowish and commercially unacceptable levels.

to 30 were prepared similarly to Sample 18 of Example 1, except that emulsion a was replaced by emulsion b, c or d. These samples were evaluated similarly to Example 1 and results thereof are shown in Table 2.

TABLE 2

| Sample No. | Sensitizing Dye | Macrocyclic Compd. | Emulsion | Iodide* (mol %) | Aging A Fog | Aging A S | Aging B Fog | Aging B S | Silver tone | Remark |
|---|---|---|---|---|---|---|---|---|---|---|
| 25 | No. 36 | — | b | 0 | 0.22 | 87 | 0.19 | 44 | C | Comp. |
| 17 | No. 36 | — | a | 4 | 0.22 | 120 | 0.26 | 94 | B | Comp. |
| 26 | No. 36 | — | c | 8 | 0.22 | 133 | 0.31 | 109 | B | Comp. |
| 27 | No. 36 | — | d | 12 | 0.18 | 77 | 0.29 | 106 | B | Comp. |
| 28 | No. 36 | S-19 | b | 0 | 0.22 | 139 | 0.24 | 123 | B | Inv. |
| 18 | No. 36 | S-19 | a | 4 | 0.22 | 160 | 0.26 | 152 | A | Inv. |
| 29 | No. 36 | S-19 | c | 8 | 0.22 | 158 | 0.27 | 152 | A | Inv. |
| 30 | No. 36 | S-19 | d | 12 | 0.21 | 139 | 0.27 | 134 | A | Inv. |

*Average iodide content in the vicinity of grain surface

Results are shown in Table 1.

TABLE 1

| Sample No. | SenSitizing Dye | Macrocyclic Compd. | Aging A Dmin | Aging A S | Aging B Dmin | Aging B S | Silver Tone | Remark |
|---|---|---|---|---|---|---|---|---|
| 1 | Dye-C | — | 0.25 | 100 | 0.31 | 65 | C | Comp. |
| 2 | Dye-C | S-19 | 0.25 | 115 | 0.33 | 84 | B | Inv. |
| 3 | Dye-C | S-27 | 0.26 | 111 | 0.35 | 81 | B | Inv. |
| 4 | Dye-C | S-35 | 0.26 | 113 | 0.34 | 82 | B | Inv. |
| 5 | No. 7 | — | 0.22 | 122 | 0.26 | 95 | B | Comp. |
| 6 | No. 7 | S-19 | 0.22 | 160 | 0.26 | 151 | A | Inv. |
| 7 | No. 7 | S-27 | 0.22 | 155 | 0.27 | 149 | A | Inv. |
| 8 | No. 7 | S-35 | 0.23 | 154 | 0.28 | 146 | A | Inv. |
| 9 | No. 31 | — | 0.23 | 110 | 0.27 | 84 | B | Comp. |
| 10 | No. 31 | S-19 | 0.23 | 151 | 0.27 | 140 | A | Inv. |
| 11 | No. 31 | S-27 | 0.23 | 145 | 0.27 | 138 | A | Inv. |
| 12 | No. 31 | S-35 | 0.24 | 142 | 0.28 | 139 | A | Inv. |
| 13 | No. 34 | — | 0.23 | 115 | 0.27 | 87 | B | Comp. |
| 14 | No. 34 | S-19 | 0.23 | 156 | 0.27 | 145 | A | Inv. |
| 15 | No. 34 | S-27 | 0.24 | 150 | 0.27 | 141 | A | Inv. |
| 16 | No. 34 | S-35 | 0.24 | 148 | 0.27 | 139 | A | Inv. |
| 17 | No. 36 | — | 0.22 | 120 | 0.26 | 94 | B | Comp. |
| 18 | No. 36 | S-19 | 0.22 | 160 | 0.26 | 152 | A | Inv. |
| 19 | No. 36 | S-27 | 0.23 | 153 | 0.27 | 150 | A | Inv. |
| 20 | No. 36 | S-35 | 0.23 | 155 | 0.27 | 145 | A | Inv. |
| 21 | No. 61 | — | 0.23 | 112 | 0.27 | 86 | B | Comp. |
| 22 | No. 61 | S-19 | 0.23 | 149 | 0.27 | 134 | A | Inv. |
| 23 | No. 61 | S-27 | 0.23 | 146 | 0.28 | 133 | A | Inv. |
| 24 | No. 61 | S-35 | 0.24 | 143 | 0.27 | 131 | A | Inv. |

As can be seen from Table 1, it was proved that the use of sensitizing dyes according to the invention in combination with nitrogen containing macrocyclic compound led to enhanced sensitivity and improved storage stability.

Example 2

Silver halide emulsions b, c and d were prepared in a manner similar to silver halide emulsion a of Example 1, except that the average iodide content in the grain surface region of 90% or outer from the grain center was varied, as shown in Table 2, with the proviso that the overall iodide content was the same as emulsion a. Thus, emulsion c and d were each comprised of core/shell type emulsion grains. Photosensitive material Samples 25 to 27 were prepared in a manner similar to Sample 17 of Example 1, except that emulsion a was replaced by emulsion b, c or d. Sample 28

As can be seen from Table 2, the use of a macrocyclic compound in combination with silver halide grains containing iodide in the vicinity of grain surface unexpextedly led to advantageous effects.

Example 3

Photographic material samples 31 to 33 were prepared in a manner similar to Sample 18 of example 1, except that after, coating, a drying time was varied, exhibiting the solvent content as shown in Table 3. These samples were evaluated similarly to Example 1. Results thereof are shown in Table 3.

TABLE 3

| Sample No. | Solvent Content (ppm) | Aging-A Fog | S |
|---|---|---|---|
| 31 | 10 | 0.2 | 139 |
| 18 | 100 | 0.22 | 160 |
| 32 | 1000 | 0.23 | 162 |
| 33 | 5000 | 0.26 | 165 |

As can be seen from Table 3, it was proved that the solvent content within the preferred range exhibited superior relationship between sensitivity and fog.

What is claimed is:

1. A thermally developable photosensitive material comprising a support having thereon an organic silver salt, a binder, a photosensitive silver halide, and an infrared-sensitizing dye represented by the following formulas (1), (2), (3) or (4) and a macrocyclic compound containing a heteroatom selected from the group consisting of a nitrogen atom, oxygen atom, sulfur atom and selenium atom:

Formula (1)

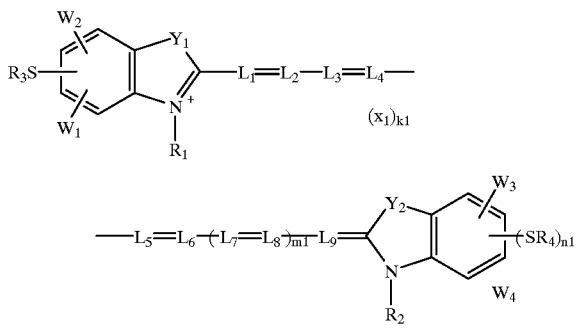

Formula (2)

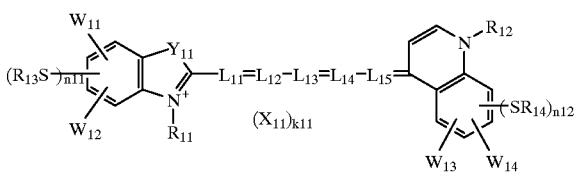

wherein $Y_1$, $Y_2$ and $Y_{11}$ each are independently an oxygen atom, sulfur atom, selenium atom or —CH=CH—; $L_1$ to $L_9$ and $L_{11}$ to $L_{15}$ each are independently a methine, group; $R_1$, $R_2$, $R_{11}$ and $R_{12}$ each are independently an aliphatic group; $R_3$, $R_4$, $R_{13}$ and $R_{14}$ each are independently an, alkenyl group, a cycloalkyl group or a heterocyclic group; $W_1$, $W_2$, $W_3$, $W_4$, $W_{11}$, $W_{12}$, $W_{13}$ and $W_{14}$ each are independently a hydrogen atom, a substituent selected from the group consisting of an alkyl group, aryl group, heterocyclic group, halogen atom, vinyl group, trifluoromethyl, alkoxy group, aryloxy group, sulfonyl group, alkoxycarbonyl group, amino group, acyl group, urcido group, thiourcido group, alkylthio group, alkenylthio group, arylthio group, hydroxy and styryl, or a non-metallic atom group necessary to form a condensed ring by bonding between $W_1$ and $W_2$, $W_3$ and $W_4$, $W_{11}$ and $W_{12}$, or $W_{13}$ and $W_{14}$; $X_1$ and $X_{11}$ each are an ion necessary to compensate for an intramolecular charge; k1 and k11 each are a number of the ion necessary to compensate for the intramolecular charge; ml is 0 or 1; and n1, n11 and n12 each are 0, 1 or 2, provided that n11 and n12 are not 0 at the same time;

Formula (3)

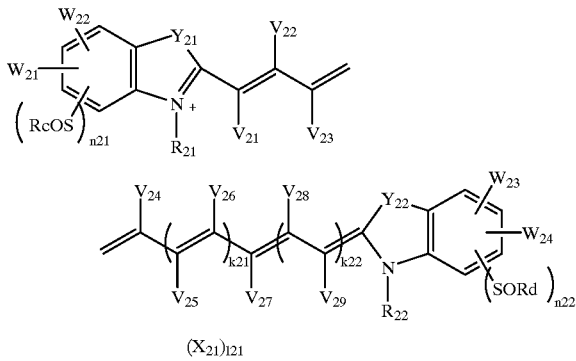

Formula (4)

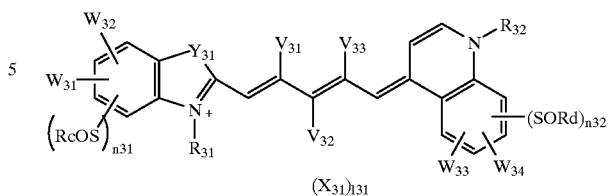

wherein $Y_{21}$, $Y_{22}$ and $Y_{31}$ each are independently an oxygen atom, a sulfur atom, a selenium atom, —C(Ra)(Rb)— group or —CH=CH— group, in which Ra and Rb each are an alkyl group, a cycloalkyl group, an aralkyl group, an alkoxyl group, an aryl group and a halogen atom; $R_{23}$, $R_{22}$, $R_{31}$ and, $R_{32}$ each are independently an aliphatic group; Rc and Rd each are independently an alkyl group, a cycloalkyl group; an aralkyl group, an aryl group or a heterocyclic group; $W_{21}$, $W_{22}$, $W_{23}$, $W_{24}$, $W_{31}$, $W_{32}$, $W_{33}$ and $W_{34}$ each are independently a hydrogen atom, a substituent selected from the group consisting of an alkyl group, aryl group, heterocyclic group, halogen atom, vinyl group, trifluoromethyl, alkoxy group, aryloxy group, sulfonyl group, alkoxycarbonyl group, amino group, acyl group, ureido group, thioureido group, alkylthio group, alkenylthio group, arylthio group, hydroxy and styryl, or a non-metallic atom group necessary to form a condensed ring by bonding between $W_{21}$ and $W_{22}$, $W_{23}$ and $W_{24}$, $W_{31}$ and $W_{32}$, or $W_{33}$ and $W_{34}$; $V_{21}$ to $V_{29}$, sand $V_{31}$ to $V_{33}$ each are independently a hydrogen atom, a halogen atom, an amino group, an alkylthio group, an arylthio, group, an alkyl group, an alkoxyl group, an aryl group, an aryloxyl group, a heterocyclic group or a non-metallic atom group necessary to form a 5-to 7-membered ring by bonding between $V_{21}$ and $V_{23}$, $V_{22}$ and $V_{24}$, $V_{23}$ and $V_{25}$, $V_{24}$ and $V_{26}$, $V_{25}$, and $V_{27}$, $V_{26}$ and $V_{28}$, $V_{27}$ and $V_{29}$, or $V_{31}$ and $V_{33}$; $X_{21}$ and $X_{31}$ each are an ion necessary to compensate for an intramolecular charge; 121 and 131 each an ion necessary to compensate for an intramolecular charge; k21 and k22 each are 0 or 1; n21, n22, n31 and n32 each are 0, 1 or 2, provided that n21 and n22, or n31 and n32 are not 0 at the same time.

2. The thermally developable photosensitive material of claim 1, wherein said macrocyclic compound is a nine- or more membered ring compound containing a heteroatom selected from the group consisting of a nitrogen atom, oxygen atom, sulfur atom and selenium atom.

3. The thermally developable photosensitive material of claim 2, wherein said heteroatom is a nitrogen atom or oxygen atom.

4. The thermally developable photosensitive material of claim 1, wherein the photosensitive silver halide is silver halide grains having an average iodide content of 0.1 to 10 mol % in the vicinity of the grain surface.

5. The thermally developable photosensitive material of claim 1, wherein the photosensitive material has an organic solvent content of 40 to 4500 ppm.

6. The thermally developable photosensitive material of claim 1, wherein said infrared-sensitizing dye is represented by formula (1) or (3).

7. The thermally developable photosensitive material of claim 1, wherein said infrared-sensitizing dye is contained in an amount of $1\times10^{-6}$ to $5\times10^{-3}$ mole/Ag mole.

8. The thermally developable photosensitive material of claim 2, wherein said macrocyclic compound is a 12- to 24-membered ring compound.

9. The thermally developable photosensitive material of claim 1, wherein said organic silver salt is comprised of grains having an average diameter of not more than 10 Wm.

10. The thermally developable photosensitive material of claim 1, wherein said organic silver salt is comprised of tabular grains having an aspect ratio of 3 or more.

11. The thermally developable photosensitive material of claim 1, wherein the total amount of the silver halide and the organic silver salt is 0.5 to 2.2 g in equivalent converted to silver per $m^2$ of the photosensitive material.

12. The thermally developable photosensitive material of claim 1, wherein said macrocyclic compound is a 12- to 24-membered ring compound containing a heteroatom selected from the group consisting of a nitrogen atom, oxygen atom, sulfur atom and selenium atom; and said organic silver salt being comprised of grains having an average diameter of not more than 10 $\mu$m.

13. The thermally developable photosensitive material of claim 6, wherein said infrared-sensitizing dye is contained in an amount of $1\times10^{-6}$ to $5\times10^{-3}$ mole/Ag mole, and said macrocyclic compound being a 12- to 24-membered ring compound containing a heteroatom selected from the group consisting of a nitrogen atom, oxygen atom, sulfur atom and selenium atom.

14. The thermally developable photosensitive material of claim 13, wherein said infrared-sensitizing dye is contained in an amount of $1\times10^{-5}$ to $2.5\times10^{-3}$ mole/Ag mole.

15. The thermally developable photosensitive material of claim 14, wherein said silver halide is silver halide grains having an average size of 0.01 to 0.1 $\mu$m and accounting for 0.1 to 25% of the total amount of the silver salt and the organic silver salt, and the amount of the binder being 1.5 to 6 g per $m^2$ of the photosensitive material.

16. The thermally developable photosensitive material of claim 6, wherein the photosensitive material has an organic solvent content of 40 to 4500 ppm.

* * * * *